(12) United States Patent
Sasaki et al.

(10) Patent No.: US 11,243,429 B2
(45) Date of Patent: Feb. 8, 2022

(54) OPTICAL BODY, METHOD FOR MANUFACTURING OPTICAL BODY, LIGHT-EMITTING APPARATUS, AND IMAGE DISPLAY APPARATUS

(71) Applicant: DEXERIALS CORPORATION, Tokyo (JP)

(72) Inventors: Koji Sasaki, Tokyo (JP); Hiroshi Sugata, Tokyo (JP); Naoki Hanashima, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 16/649,841

(22) PCT Filed: Oct. 5, 2018

(86) PCT No.: PCT/JP2018/037451
§ 371 (c)(1),
(2) Date: Mar. 23, 2020

(87) PCT Pub. No.: WO2019/070072
PCT Pub. Date: Apr. 11, 2019

(65) Prior Publication Data
US 2020/0278583 A1    Sep. 3, 2020

(30) Foreign Application Priority Data

Oct. 6, 2017   (JP) .............................. JP2017-196141

(51) Int. Cl.
*G02F 1/133*       (2006.01)
*G02F 1/13357*    (2006.01)
(Continued)

(52) U.S. Cl.
CPC ....... *G02F 1/133606* (2013.01); *G02B 1/045* (2013.01); *G02B 3/00* (2013.01);
(Continued)

(58) Field of Classification Search
CPC ... G02F 1/133606; G02F 2001/133607; G02B 6/0036; G02B 6/0043
(Continued)

(56) References Cited

U.S. PATENT DOCUMENTS

2002/0080598 A1*  6/2002  Parker ...................... F21V 5/00
                                                                  362/616
2006/0152943 A1*  7/2006  Ko .......................... G02B 5/045
                                                                  362/627
(Continued)

FOREIGN PATENT DOCUMENTS

CN    106597599 A    4/2017
JP    H09-269489 A   10/1997
(Continued)

*Primary Examiner* — Christopher M Raabe
(74) *Attorney, Agent, or Firm* — Paratus Law Group, PLLC

(57) ABSTRACT

There is provided a novel and improved optical body, method for manufacturing an optical body, light-emitting apparatus, and image display apparatus capable of improving emitted luminance and transparency, the optical body including: a base material; and a light extraction section, formed on at least one surface of the base material, that extracts internally propagated light incident inside the base material from a side face of the base material to an outside of the base material. The light extraction section includes a concave-convex structure in which at least one of concavities and convexities has a frustum shape, a fill ratio of the concave-convex structure is 15% or greater, and a light transmittance is 50% or greater.

8 Claims, 28 Drawing Sheets

(51) Int. Cl.
*G02B 1/04* (2006.01)
*G02B 3/00* (2006.01)
*F21V 8/00* (2006.01)
*G02F 1/1335* (2006.01)

(52) U.S. Cl.
CPC ......... *G02B 6/0036* (2013.01); *G02B 6/0038* (2013.01); *G02B 6/0065* (2013.01); *G02F 1/133607* (2021.01)

(58) Field of Classification Search
USPC ....................................................... 362/97.3
See application file for complete search history.

(56) References Cited

U.S. PATENT DOCUMENTS

| | | | | |
|---|---|---|---|---|
| 2007/0165394 | A1* | 7/2007 | Chang | G02F 1/133606 362/97.3 |
| 2008/0130117 | A1* | 6/2008 | Hsu | G02B 5/0231 359/599 |
| 2008/0137371 | A1* | 6/2008 | Hsu | G02B 5/0215 362/613 |
| 2008/0219026 | A1* | 9/2008 | Zhu | G02B 6/0036 362/626 |
| 2008/0266873 | A1* | 10/2008 | Chang | G02B 6/0078 362/309 |
| 2008/0266874 | A1* | 10/2008 | Chang | G02B 5/001 362/309 |
| 2011/0019426 | A1* | 1/2011 | Kuiseko | G02B 5/045 362/354 |
| 2011/0051022 | A1* | 3/2011 | Kim | G02F 1/133606 349/15 |
| 2015/0185402 | A1* | 7/2015 | Jang | F21S 43/195 362/612 |
| 2018/0120637 | A1* | 5/2018 | Yun | G02F 1/133602 |
| 2020/0310020 | A1* | 10/2020 | Sasaki | G02B 1/045 |

FOREIGN PATENT DOCUMENTS

| | | |
|---|---|---|
| JP | H10-153779 A | 6/1998 |
| JP | 2003-141920 A | 5/2003 |
| JP | 2007-306576 A | 11/2007 |
| JP | 2008-058790 A | 3/2008 |
| JP | 2008-275921 A | 11/2008 |
| JP | 2009-181914 A | 8/2009 |
| JP | 2010-073469 A | 4/2010 |
| JP | 2010-117707 A | 5/2010 |
| JP | 2011-192484 A | 9/2011 |
| JP | 2012-532339 A | 12/2012 |
| JP | 2013-080120 A | 5/2013 |

* cited by examiner 11a-2
11a, 11a-1
11b 11a-2
11a, 11a-1
11b

OPTICAL BODY, METHOD FOR MANUFACTURING OPTICAL BODY, LIGHT-EMITTING APPARATUS, AND IMAGE DISPLAY APPARATUS

CROSS REFERENCE TO PRIOR APPLICATION

This application is a National Stage Patent Application of PCT International Patent Application No. PCT/JP2018/037451 (filed on Oct. 5, 2018) under 35 U.S.C. § 371, which claims priority to Japanese Patent Application No. 2017-196141 (filed on Oct. 6, 2017), which are all hereby incorporated by reference in their entirety.

TECHNICAL FIELD

The present invention relates to an optical body, a method for manufacturing an optical body, a light-emitting apparatus, and an image display apparatus.

BACKGROUND ART

As disclosed in Patent Literature 1 and Patent Literature 2, for example, an optical body combining the waveguide phenomenon of light and a phenomenon of scattering light with a concave-convex structure is known as one type of optical body. Such an optical body is also called a light guide panel. A concave-convex structure is formed on the surface of one side of the light guide panel. Additionally, inside the light guide panel, light is incident from a light source provided on a side face of the light guide panel. Light incident inside the light guide panel, or in other words, internally propagated light, propagates inside the light guide panel while reflecting off the surface of the light guide panel (that is, the interface between the interior and the exterior of the light guide panel). After that, the internally propagated light reflects off the surface of the concave-convex structure, and is emitted from the surface on the other side of the light guide panel. In other words, in the light guide panel, light incident from the side face of the light guide panel is emitted from the surface of the light guide panel. The light guide panel is used as a luminous body used with various types of display apparatus, a luminous body used to display various types of images, or as a luminous body emitting ultraviolet light, for example. In the case in which a light guide panel is used in a display apparatus, the light guide panel is used as what is called a backlight. Examples of such a display apparatus include various types of LCDs (for example, local dimming LCDs), passive-type display apparatus, and the like. Examples of a luminous body used to display various types of images include light ornament panels for amusement facilities, illuminated panels for advertising such as digital signage, and the like. In other words, in this case, the light guide panel itself displays various images. In such a light guide panel, by turning a light source on and off, an expression becomes possible in which light appears to float up from the sites where the pattern of the concave-convex structure is formed. Consequently, the region in which the concave-convex structure is formed becomes a light-emitting region. Depending on the shape of the light-emitting region, various designs (such as a scale of a thermometer) are expressed.

CITATION LIST

Patent Literature

Patent Literature 1: JP 2013-80120A
Patent Literature 2: JP 2009-181914A
Patent Literature 3: JP 2008-58790A

SUMMARY OF INVENTION

Technical Problem

Meanwhile, recently, there is strengthening demand to use light guide panels capable of displaying various images (that is, designs) overlaid on top of each other. By using light guide panels overlaid on top of each other, it is possible to provide new and unprecedented visual experiences to a viewer. In other words, by turning on the respective light guide panels, the light-emitting regions of the respective light guide panels are superimposed and viewed by the viewer. On the other hand, by turning off either one of the light guide panels (for example, on the front side) and turning on the other light guide panel (for example, on the rear side), only the light-emitting region of the other light guide panel is viewed by the viewer.

In the case of using light guide panels overlaid on top of each other, there is demand to achieve a high level of both emitted luminance and transparency in each of the light guide panels. In other words, when each of the light guide panels is on, the emission of light at a high luminance in the light-emitting region is demanded. This is because causing the light-emitting region to emit light at a high luminance enables the viewer to see the design of the light-emitting region correctly. On the other hand, when each of the light guide panels is off, high transparency is demanded. This is because raising the transparency of each of the light guide panels enables the viewer to see only the light-emitting region of the other light guide panel correctly when one of the light guide panels is off, and the other light guide panel is on.

However, no technology that addresses the demands described above adequately has been proposed. For example, Patent Literature 1 discloses a light guide panel capable of displaying a design. However, Patent Literature 1 makes no considerations regarding the use of optical bodies overlaid onto each other. In other words, Patent Literature 1 makes no considerations regarding the transparency of the light guide panel. For this reason, in the hypothetical case of overlaying the light guide panels disclosed in Patent Literature 1 onto each other, it is anticipated that, when one of the light guide panels is off, and the other light guide panel is on, the light-emitting region of the other light guide panel will be difficult to see. This is because the transparency of the light guide panel is not favorable. Specifically, since the concave-convex structure formed in the light-emitting region of one of the light guide panels scatters extraneous light (including emitted light from the other light guide panel), the viewer sees the light-emitting region of one of the light guide panels even when the one of the light guide panels is off. That is, since the light-emitting region of the one of the light guide panels is superimposed over the light-emitting region (the light-emitting region emitting light) of the other light guide panel, the light-emitting region of the other light guide panel becomes difficult to see.

One conceivable method of addressing such an issue is to broaden the pitch of the concave-convex structure. With this arrangement, since more extraneous light may be transmitted from between the concavities and convexities, increased transparency may be expected. However, with this method, since another problem of lowered luminance of the light-emitting region occurs, the above issue is not addressed at a basic level.

In Patent Literature 2, the light guide panel is not even used for the purpose of displaying images in the first place. Consequently, if the light guide panels disclosed in Patent Literature 2 are simply overlaid onto each other, problems similar to Patent Literature 1 are predicted to occur.

Note that Patent Literature 1 and Patent Literature 2 cite frustum shapes as one example of the shape included in a concave-convex structure. The inventors conducted a detailed investigation into frustum shapes, and it became apparent that by making the concave-convex structure take a frustum shape (specifically, shaping at least one of the concavities and the convexities included in the concave-convex structure into a frustum shape), it is possible to achieve a high level of both emitted luminance and transparency in some cases. However, a high level of emitted luminance and transparency could not be achieved by simply making the concave-convex structure take a frustum shape.

In addition, Patent Literature 3 describes the use of light guide panels overlaid on top of each other in a vehicle display apparatus. In this Patent Literature 3, two light guide panels on which light-emitting regions with different designs are drawn are overlaid onto each other in the front-rear direction, and each of the light guide panels is selectively caused to emit light. This enables a wide variety of designs to be displayed in a limited space. In Patent Literature 3, part of the surfaces of the light guide panels are roughened to form light-emitting regions, whilst there is no description regarding the transparency when the light guide panels are off. Consequently, problems similar to Patent Literature 1 and Patent Literature 2 are predicted to occur.

The present invention was therefore made in view of the above problems, and has an object to provide a novel and improved optical body, method for manufacturing an optical body, light-emitting apparatus, and image display apparatus capable of improving the emitted luminance and the transparency.

Solution to Problem

In order to solve the above problems, according to an aspect of the present invention, there is provided an optical body including: a base material; and a light extraction section, formed on at least one surface of the base material, that extracts internally propagated light incident inside the base material from a side face of the base material to an outside of the base material. The light extraction section includes a concave-convex structure in which at least one of concavities and convexities has a frustum shape, a fill ratio of the concave-convex structure is 15% or greater, and a light transmittance is 50% or greater.

Here, the concave-convex structure may be arranged periodically.

The concave-convex structure may be arranged by any one or more modes selected from a group consisting of a lattice arrangement, a staggered arrangement, and a hexagonal close-packed arrangement.

A ratio A/B of an area B of a unit region obtained by interconnecting central axes of minimum structural units of the concave-convex structure and an area A of a portion existing inside the unit region in a tapered section included in the minimum structural unit may be 0.68 or less.

The concave-convex structure may be arranged randomly.

The concave-convex structure may include any one or more types of frustum shapes selected from a group consisting of a circular frustum, an elliptical frustum, a regular polygonal frustum, a polygonal frustum, a semi-circular frustum, a quarter-circular frustum, and a deformed polygonal frustum.

The base material may include any one or more types of materials selected from a group consisting of acrylic resin, polycarbonate, polyethylene terephthalate, and glass.

The concave-convex structure may include a cured ultraviolet-curing resin.

According to another aspect of the present invention, there is provided a method for manufacturing an optical body that manufactures the above optical body, the method including: producing a transfer mold having an inverse shape of the concave-convex structure; forming an uncured resin layer on a surface of the base material; and curing the uncured resin layer while also transferring the concave-convex structure of the transfer mold to the cured resin layer.

According to another aspect of the present invention, there is provided a light-emitting apparatus including: the above optical body; and a light source, provided on a side face of the optical body, that causes light to be incident inside the optical body from the side face of the optical body. According to another aspect of the present invention, there is provided an image display apparatus having a configuration in which a plurality of the light-emitting apparatuses are overlaid onto of each other.

Advantageous Effects of Invention

According to the present invention as described above, since the fill ratio of the concave-convex structure is 15% or greater, the tapered faces of the frustum shapes are densely distributed. Consequently, since more internally propagated light can be emitted to the outside, when the optical body is on, the emitted luminance can be raised. In the frustum shapes, a flat section is formed. Consequently, even if the fill ratio of the concave-convex structure is raised, the concave-convex structure includes many flat portions, or in other words, the flat sections of the frustum shapes and the flat sections of the portion other than the frustum shapes exist. Consequently, when the optical body is off, extraneous light can be transmitted with high transmittance. Specifically, the transmittance is 50% or greater. Consequently, it becomes possible to improve the emitted luminance and the transparency.

DESCRIPTION OF EMBODIMENTS

Figure 1:
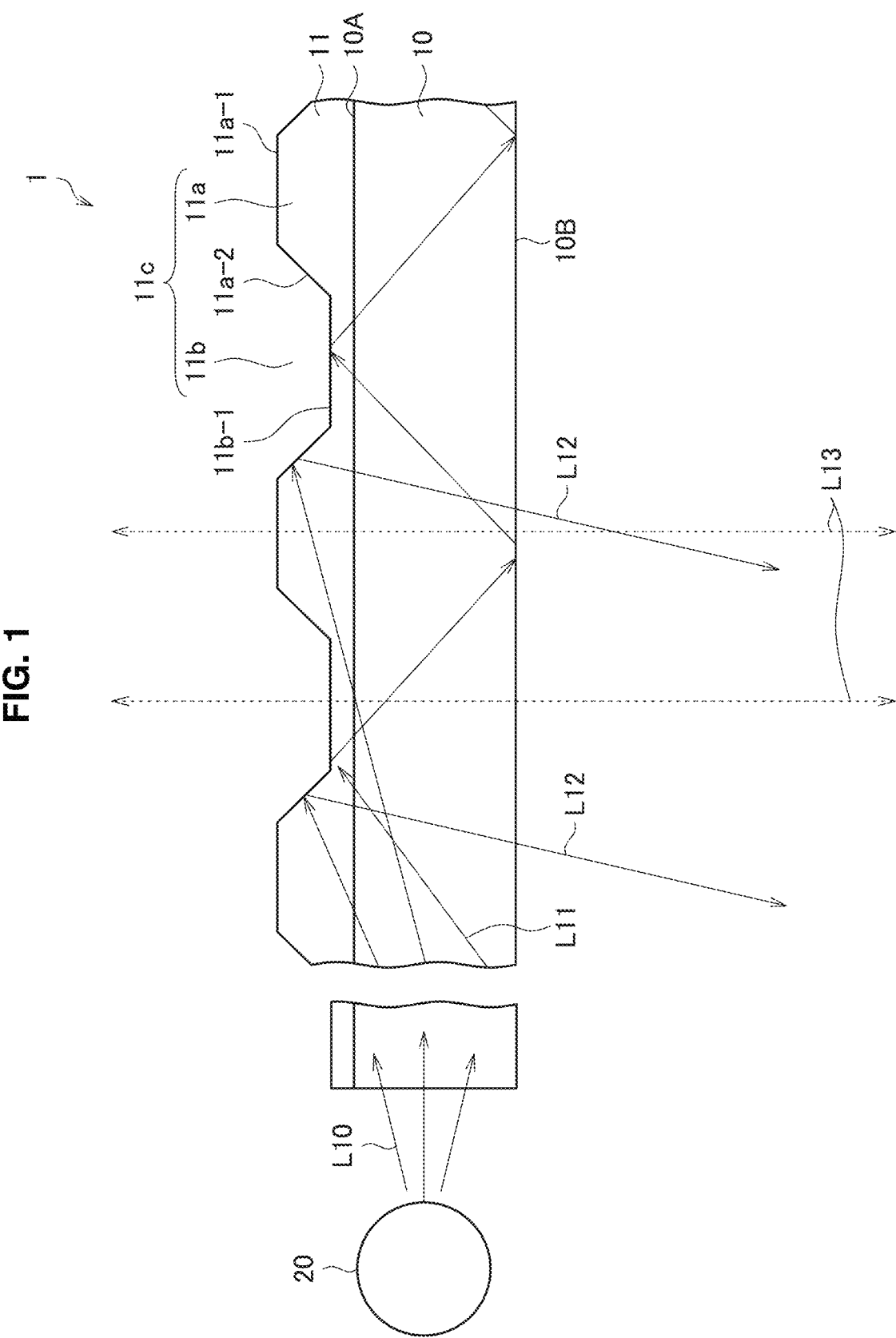
FIG. 1 is a lateral cross-section diagram illustrating a diagrammatic configuration of an optical body according to an embodiment of the present invention.
Figure 2:
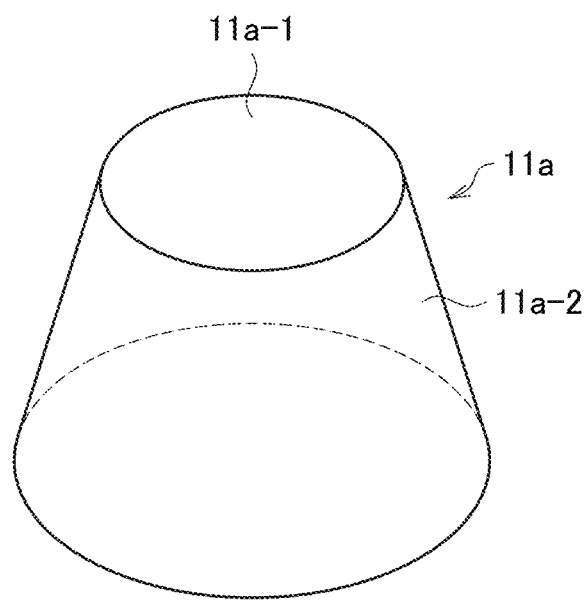
FIG. 2 is a lateral cross-section diagram illustrating an example of a frustum shape.
Figure 3:
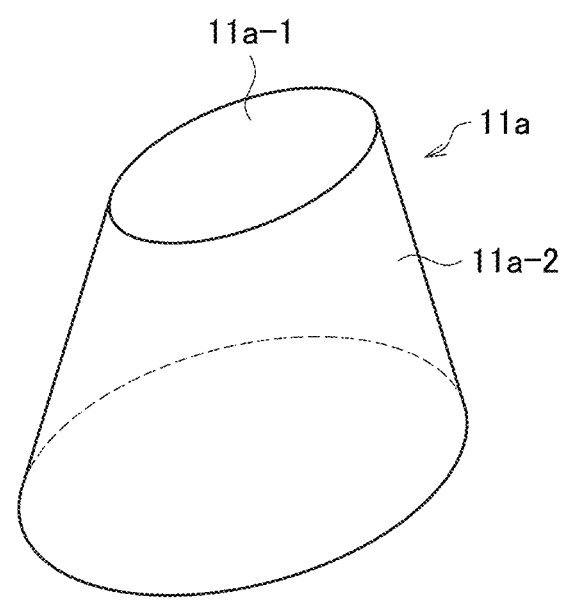
FIG. 3 is a lateral cross-section diagram illustrating an example of a frustum shape.
Figure 4:
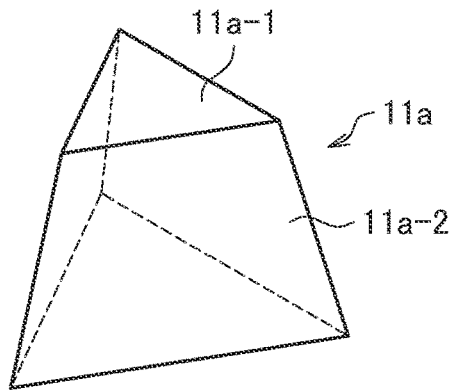
FIG. 4 is a lateral cross-section diagram illustrating an example of a frustum shape.
Figure 5:
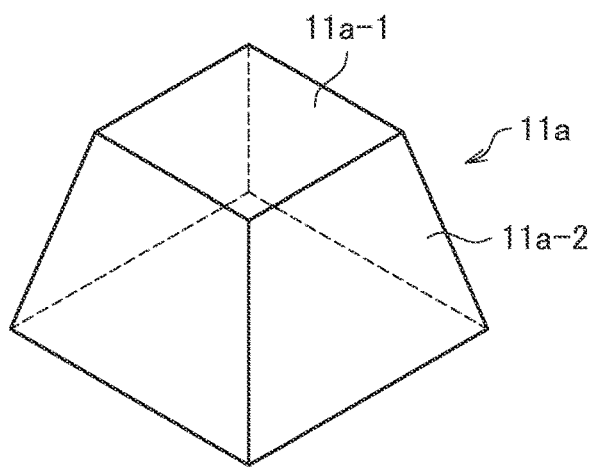
FIG. 5 is a lateral cross-section diagram illustrating an example of a frustum shape.
Figure 6:
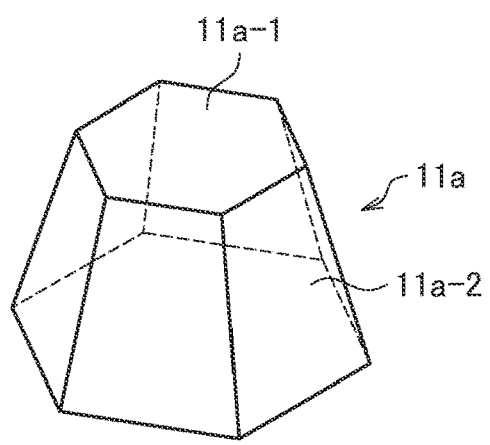
FIG. 6 is a lateral cross-section diagram illustrating an example of a frustum shape.
Figure 7:
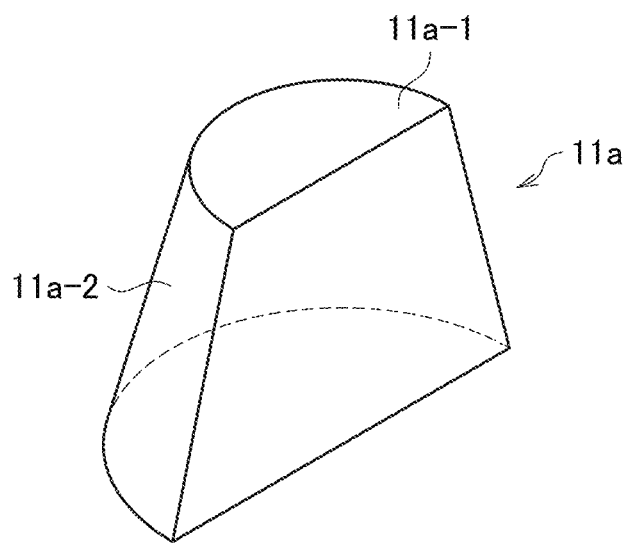
FIG. 7 is a lateral cross-section diagram illustrating an example of a frustum shape.
Figure 8:
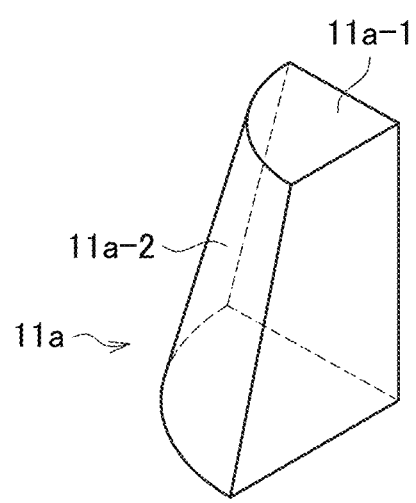
FIG. 8 is a lateral cross-section diagram illustrating an example of a frustum shape.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

<1. Configuration of Optical Body>

First, a configuration of an optical body 1 according to the present embodiment will be described on the basis of FIGS. 1 to 14. The optical body 1 is a member also referred to as a light guide panel, and is provided with a base material 10 and a light extraction section 11. The light extraction section 11 is formed in at least a partial region of a surface 10A of the base material 10.

The base material 10 propagates light incident inside the base material 10, or in other words internally propagated light, in the planar direction of the base material 10 (that is, the direction perpendicular to the thickness direction, which is the horizontal direction in FIG. 1). Consequently, the base material 10 preferably is a resin with excellent photoconductivity, and preferably is a thermoplastic resin. Examples of such a resin include acrylic resins (such as poly methyl methacrylate), polycarbonate, polyethylene terephthalate (PET; note that the properties of PET are not particularly specified, and the PET may be amorphous or stretched), triacetyl cellulose (TAC), cycloolefin copolymers, and cycloolefin polymers. Also, the base material 10 may be an inorganic material with excellent photoconductivity. Examples of such an inorganic material include silicon-based materials, more specifically glass and the like. The thickness of the base material 10 is not particularly limited, and it is sufficient to adjust the thickness appropriately in accordance with the use and the like of the optical body 1.

The light extraction section 11 is formed in at least a partial region of the surface 10A. The light extraction section 11 includes a concave-convex structure 11c formed on the surface thereof.

The light extraction section 11 extracts and emits internally propagated light to the outside of the optical body 1. The line L10 in FIG. 1 illustrates the optical path of incident light incident inside the base material 10 from a light source 20, the line L11 illustrates the optical path of internally propagated light, and the line L12 illustrates the optical path of light extracted to the outside, or in other words, extracted light. In other words, internally propagated light reaching the light extraction section 11 is reflected (scattered) by the concave-convex structure 11c, and by the diffraction phenomenon of light, emitted to the outside from the surface 10B. The light extraction section 11 is formed in sites where the extraction of light is desired on the surface 10A. By turning the light source 20 on and off, an expression becomes possible in which light appears to float up from the region where the pattern of the light extraction section 11 is formed, or in other words, the light-emitting region. Depending on the shape of the light-emitting region, various designs are expressed. The designs formed by the light-emitting region are various, and include a frame, a scale, and numbers of a speed meter, various character images, text images, or the like, for example. Obviously, the designs are not limited to these examples. The present embodiment may be applied to a digital signage in amusement equipment such as Pachinko, Japanese pinball game machine, for example. In this case, the luminous intensity of the light source 20 (which will be described later) can be changed to provide a change in visibility of the optical body 1. In addition, the optical bodies 1 overlaid on top of each other may be used in a limited space such as a vehicle display apparatus. The optical body 1 may be used independently.

Herein, the concave-convex structure 11c will be described in further detail. The concave-convex structure 11c includes large numbers of convexities 11a and concavities 11b. The convexities 11a have a shape protruding outward in the thickness direction of the optical body 1, while the concavities 11b have a shape depressed inward in the thickness direction of the optical body 1.

Figure 44:
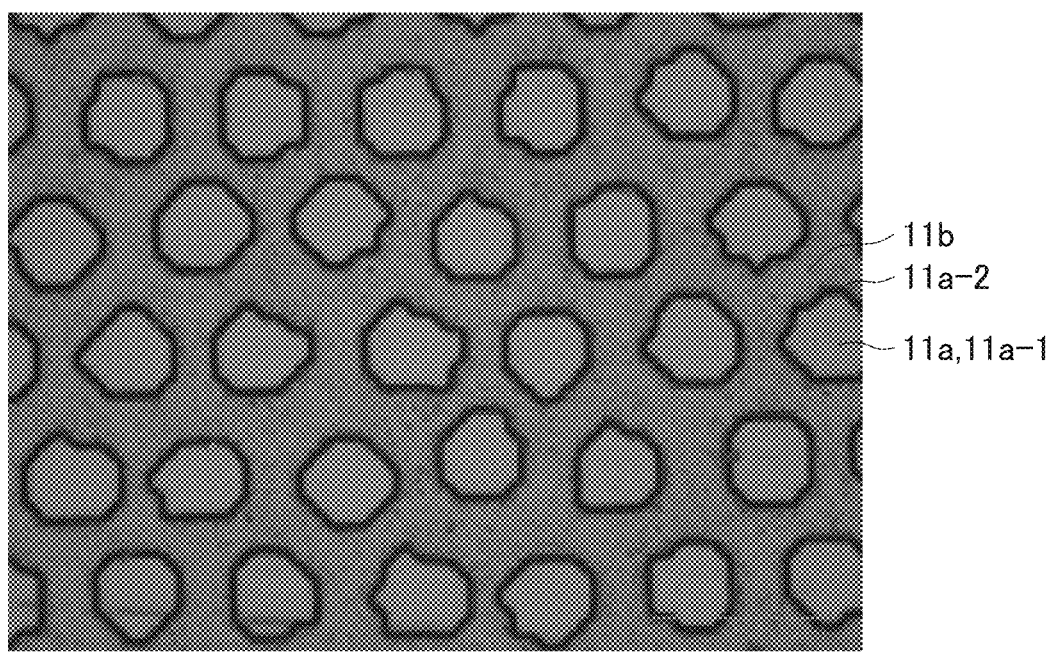
FIG. 44 is a plan-view optical micrograph illustrating an example of the concave-convex structure.
Figure 45:
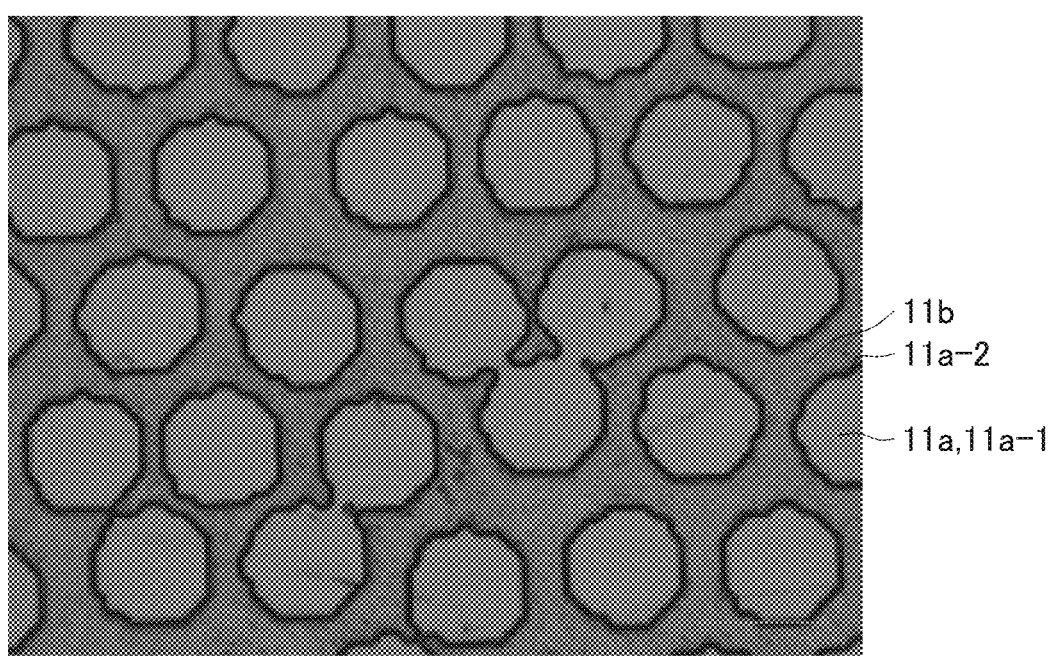
FIG. 45 is a plan-view optical micrograph illustrating an example of the concave-convex structure.

The convexities 11a have a frustum shape. Herein, a frustum shape means the shape obtained by removing, from a cone, a similarly reduced cone sharing an apex with the cone. Specifically, the convexities 11a are provided with a flat section 11a-1 forming the top edge face of the frustum (the smaller of the two mutually parallel planes of the frustum), and a tapered section 11a-2 forming the tapered face of the frustum. Herein, the type of the frustum shape is not particularly limited. Examples of the frustum shape include a circular frustum (FIG. 2), an elliptical frustum (FIG. 3), a regular polygonal frustum (FIGS. 4 to 6), a polygonal frustum, a semi-circular frustum (FIG. 7), a quarter-circular frustum (FIG. 8), and the like. Examples of the regular polygonal frustum include a regular triangular frustum (FIG. 4), a regular quadrilateral frustum (FIG. 5), and a regular hexagonal frustum (FIG. 6), and the like. Further, the frustum shape may be a deformed polygonal frustum shape (that is, a frustum shape in which the flat section 11a-1 has a deformed (distorted) polygon). FIGS. 44 and 45 illustrate examples in which the convexities 11a have a deformed polygonal frustum shape. As illustrated in FIGS. 44 and 45, in the case where the convexities 11a have a deformed polygonal frustum shape, the respective convexities 11a may have different shapes from each other. Obviously, the respective convexities 11a may have the same shape. The convexities 11a may include any one type of these frustum shapes, or multiple types of frustum shapes.

Herein, by shaping the convexities 11a into semi-circular frustums, the area of the tapered section 11a-2 can be reduced by approximately 18% compared to a circular frustum. Furthermore, by shaping the convexities 11a into quarter-circular frustums, the area of the tapered section 11a-2 can be reduced by approximately 45% compared to a circular frustum. With this arrangement, just the desired amount of area of the tapered section 11a-2 (that is, just enough to achieve the desired emitted luminance) can be formed. Note that although the area of the flat section 11a-1 decreases compared to a circular frustum, the area of a flat section 11b-1 increases correspondingly. Furthermore, to the extent that the area of the tapered section 11a-2 decreases, the area of the flat section 11b-1 increases correspondingly. As a result, the total area of the flat sections 11a-1 and 11b-1 increases. As a result, the transmittance can be raised. Note that in the case of shaping the convexities 11a into semi-circular frustums or quarter-circular frustums, it is desirable to point the tapered section 11a-2 toward the light source 20 side. This is because the tapered section 11a-2 has a light extraction function. Even if internally propagated light reaches the other portion (that is, the portion perpendicular to the edge face of the optical body 1), the internally propagated light is reflected to the edge face side of the optical body 1.

Also, by shaping the convexities 11a into semi-circular frustums or quarter-circular frustums, it is possible to display designs with a variety of light emission colors from the same optical body 1. For example, in the case of shaping the convexities 11a into semi-circular frustums, light sources 20 that emit light of different colors are disposed on different edge faces of the optical body 1. Additionally, the tapered section 11a-2 of the convexities 11a included in a first light-emitting region is pointed towards a first light source 20. Furthermore, the tapered section 11a-2 of the convexities 11a included in a second light-emitting region is pointed towards a second light source 20. These convexities 11a may emit internally propagated light to the outside only at the tapered section 11a-2. Consequently, the first light-emitting region is capable of displaying a design with a light emission color corresponding to the first light source 20, while the second light-emitting region is capable of displaying a design with a light emission color corresponding to the second light source 20. By a similar principle, in the case of quarter-circular frustums, it is possible to display designs of four colors (such as white, red, blue, and green, for example).

The flat section 11a-1 is a portion that is parallel to the planar direction of the base material 10, and transmits extraneous light. Although details will be described later, in the present embodiment, since the convexities 11a include the flat section 11a-1, even if the fill ratio of the concave-convex structure is raised to raise the emitted luminance, a high transmittance can be maintained.

The tapered section 11a-2 is a portion that reflects and emits internally propagated light to the outside. The tapered section 11a-2 may have a planar shape or a curved shape (spherical shape). In the case in which the tapered section 11a-2 is planar, the angle obtained between the tapered section 11a-2 and the planar direction of the base material 10 preferably is approximately 45 degrees, but may also be approximately from 25 to 75 degrees. In the case in which the tapered section 11a-2 is a spherical shape, the radius of curvature (see FIG. 22) of the tapered section 11a-2 is not particularly limited. However, as the radius of curvature becomes larger, the area of the plan view of the tapered section 11a-2 increases while the area of the plan view of the flat section 11a-1 decreases, and thus there is a tendency for the emitted luminance to increase and the transmittance to decrease. Consequently, it is sufficient to set the radius of curvature according to the properties demanded of the optical body 1. The correlation between the radius of curvature and both the emitted luminance and transmittance will be described later. Herein, a "plan view" related to the concave-convex structure 11c means projecting the concave-convex structure 11c onto a plane parallel to the planar direction. Consequently, the area of the plan view refers to the area of the region obtained by projecting the concave-convex structure 11c onto a plane parallel to the planar direction (see FIGS. 12 and 13).

In the concave-convex structure 11c, the region other than the convexities 11a forms the concavities 11b. The flat section (floor section) 11b-1 of the concavities 11b is the portion that is parallel to the planar direction of the base material 10, and transmits extraneous light. Note that extraneous light is, for example, extraneous light emitted from another optical body (see FIGS. 15 to 17) disposed on the back side (that is, the surface 10A side) of the optical body 1. In the case in which extraneous light emitted from the other optical body is transmitted through the optical body 1, the viewer is able to see the light-emitting region of the other optical body disposed on the back side of the optical body 1.

The fill ratio of the concave-convex structure 11c is 15% or greater. Herein, the fill ratio of the concave-convex structure 11c is the ratio of the area (exclusive area) of the plan view occupied by the convexities 11a (that is, the portion that includes the frustum shapes) with respect to the total area of the plan view of the concave-convex structure 11c. The higher the fill ratio, the higher the emitted luminance can be raised. The fill ratio is preferably 25% or greater, more preferably 40% or greater, more preferably 70% or greater, and more preferably 100%. The fill ratio of the concave-convex structure 11c can be measured by observing the plan-view shape of the concave-convex structure 11c. The plan view shape of the concave-convex structure 11c can be observed with an optical microscope, for example.

In this way, in the present embodiment, the convexities 11a are frustum shapes that include the flat section 11a-1. Consequently, when the optical body 1 is on (that is, when the light source 20 is emitting light), light is incident on the optical body 1 from the light source 20. Light incident on the optical body 1, or in other words internally propagated light, propagates inside the optical body 1 while being totally reflected, and eventually reaches the concave-convex structure 11c. The internally propagated light reaching the tapered section 11a-2 of the convexities 11a is reflected (scattered) by the tapered section 11a-2, and by the diffraction phenomenon of light, emitted to the outside from the surface 10B. The internally propagated light reaching the other portions of the concave-convex structure 11c, that is, the flat section 11a-1 of the convexities 11a and the flat section 11b-1 of the concavities 11b, is totally reflected, and propagates farther inside the optical body 1. With this arrangement, since the region where the concave-convex structure 11c is formed, that is, the light-emitting region emits light, the viewer is able to see the design of the light-emitting region.

Figure 9:
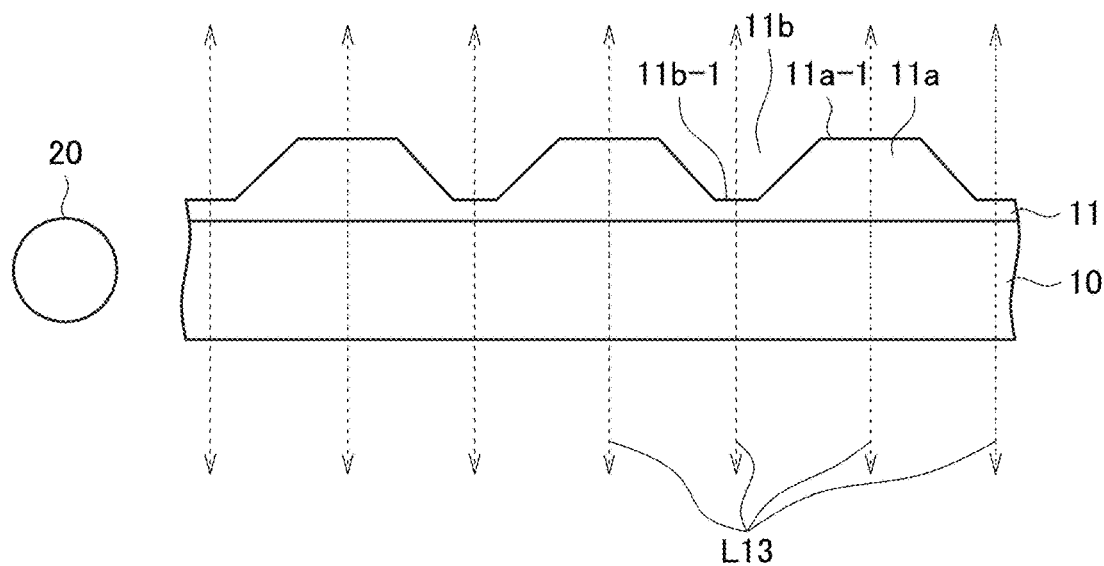
FIG. 9 is a lateral cross-section diagram illustrating the off state of the optical body.

On the other hand, as illustrated in FIG. 9, when the optical body 1 is off (that is, when the light source 20 is not emitting light), since light is not incident inside the optical body 1, the light-emitting region does not emit light. Additionally, the flat section 11a-1 of the convexities 11a and the flat section 11b-1 of the concavities 11b transmit extraneous light. The line L13 illustrates the optical path of extraneous light. In this way, in the present embodiment, extraneous light can be transmitted not only by the flat section 11b-1 of the concavities 11b but also by the flat section 11a-1 of the convexities 11a. Consequently, a high transmittance can be achieved. On the other hand, the tapered section 11a-2 of the convexities 11a is capable of reflecting and emitting internally propagated light to the outside. Herein, in the present embodiment, since the fill ratio of the concave-convex structure 11c is 15% or greater, the tapered section 11a-2 of the convexities 11a is densely distributed. Consequently, since more internally propagated light can be emitted to the outside, when the optical body 1 is on, the emitted luminance can be raised.

On the other hand, the flat section 11a-1 is formed in the convexities 11a. Consequently, even if the fill ratio of the concave-convex structure 11c is raised, the concave-convex structure 11c includes many flat portions, or in other words, the flat section 11a-1 of the convexities 11a and the flat section 11b-1 of the concavities 11b. Consequently, when the optical body 1 is off, extraneous light can be transmitted with high transmittance. Specifically, the transmittance is 50% or greater. Herein, the transmittance is the ratio of the intensity of transmitted light with respect to the total light intensity of extraneous light. In the present embodiment, since many flat portions exist in the concave-convex structure 11c, there is a tendency for the transmittance to rise. However, in the case of setting an extremely high fill ratio or the like, the transmittance may become less than 50%. In this case, by adjusting the area ratio A/B described later, the transmittance can be set to 50% or greater more reliably. The transmittance is preferably 65% or greater. Consequently, in the present embodiment, it is possible to achieve both high emitted luminance and high transmittance.

Note that, as demonstrated by FIG. 1, even when the optical body 1 is on, extraneous light transmits through the flat section 11a-1 of the convexities 11a and the flat section 11b-1 of the concavities 11b. Consequently, strictly speaking, the light emitted from the light-emitting region also includes extraneous light. With regard to this point, by raising the fill ratio of the concave-convex structure 11c and raising the emitted luminance, it is possible to make the extraneous light less noticeable (make the image due to extraneous light substantially invisible). Conversely, by intentionally dropping the fill ratio in the range of 15% or greater, it is also possible to cause the design of the light-emitting region and the image due to extraneous light to be superimposed and seen by the viewer.

Figure 10:
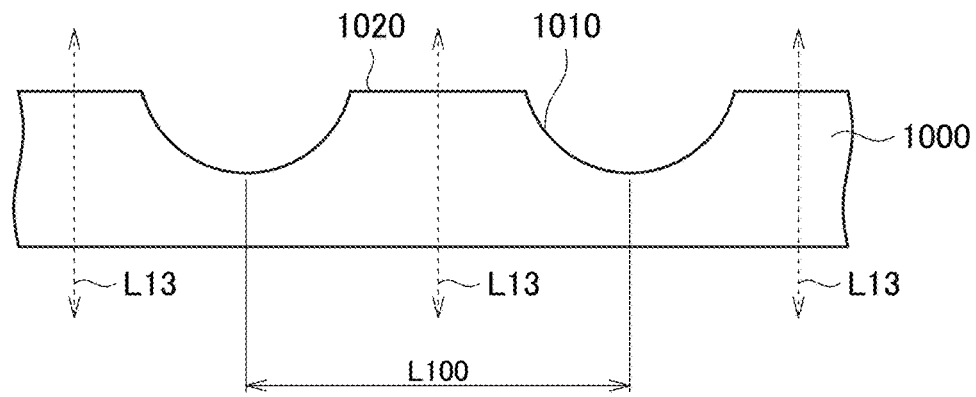
FIG. 10 is a lateral cross-section diagram illustrating an example of a case in which the concave-convex structure is a microlens array.

FIG. 10 illustrates an optical body 1000 as one example of an optical body according to the related art. The optical body 1000 includes microlens-shaped concavities 1010, in which the concavities 1010 reflect and emit internally propagated light to the outside. The regions in between the concavities 1010 become convexities 1020. In this example, by raising the fill ratio of the concave-convex structure, it is possible to raise the emitted luminance when the optical body 1000 is on. However, since the flat portions are only the top edge faces of the convexities 1020, the transmittance of extraneous light is lowered when the optical body 1000 is off. In other words, since the concavities 1010 scatter extraneous light even when the optical body 1000 is off, the viewer sees the design due to the concave-convex structure. One method of addressing this problem is to lengthen the pitch L100 between the concavities 1010. According to this method, since the area of the plan view of the flat portions that transmit extraneous light, or in other words the top edge faces of the convexities 1020, can be raised, the transmittance of extraneous light can be raised. However, in this case, since the fill ratio of the concave-convex structure is lowered, the emitted luminance is lowered when the optical body 1000 is on. Consequently, in the case in which the concave-convex structure does not have frustum shapes, it is difficult to achieve a high level of both emitted luminance and transparency.

Patent Literature 1 and Patent Literature 2 cite frustum shapes as the shape included in a concave-convex structure. By making the concave-convex structure take a frustum shape, many flat portions can be formed in the concave-convex structure, and therefore there is a possibility of achieving high transmittance when the optical body is off. However, achieving a high level of both emitted luminance and transparency is difficult to achieve by simply making the concave-convex structure take a frustum shape. Specifically, if the density of the concave-convex structure is too low, it is difficult to achieve a high emitted luminance. Patent Literature 1 and Patent Literature 2 do not at all anticipate the use of optical bodies overlaid onto each other. In other words, Patent Literature 1 and Patent Literature 2 do not describe raising the fill ratio of the concave-convex structure to achieve a high level of both emitted luminance and transparency. Consequently, with the technologies disclosed in Patent Literature 1 and Patent Literature 2, it is difficult to achieve a high level of both emitted luminance and transparency. Note that other examples of the concave-convex structure according to the related art include a concave-convex structure obtained by embossing, a concave-convex structure having a prism shape, a concave-convex structure obtained by ink printing, and the like, but even in the case of employing any of the concave-convex structures, it is difficult to achieve a high level of both emitted luminance and transparency.

Figure 11:
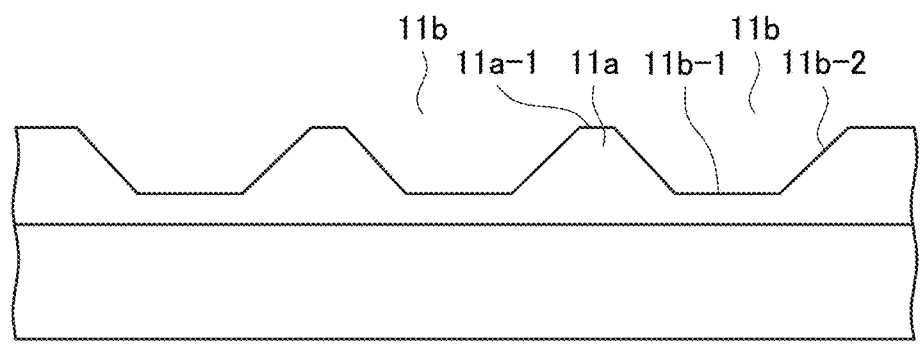
FIG. 11 is a lateral cross-section diagram illustrating a modification of the present embodiment.

Note that in the example illustrated in FIG. 1, the convexities 11a have a frustum shape, but as illustrated in FIG. 11, the concavities 11b may also have a frustum shape. In this case, the concavities 11b are provided with the flat section 11b-1 that forms the top edge face of the frustum, and a tapered section 11b-2 that forms the tapered face of the frustum. Their functions are similar to the case in which the convexities 11a include a frustum shape. Even in this case, effects similar to the above are obtained.

The concave-convex structure 11c may be arranged periodically or randomly. Herein, the concave-convex structure 11c being arranged periodically means that the pitch of the concave-convex structure 11c has periodicity, while the concave-convex structure 11c being arranged randomly means that the pitch of the concave-convex structure 11c is random. The pitch of the concave-convex structure 11c means the distance in the planar direction between the central axes of structures having a frustum shape (hereinafter also called a "frustum structure"; in the example of FIG. 1, the frustum structure is the convexities 11a, while in the example of FIG. 11, the frustum structure is the concavities 11b) among the convexities 11a and the concavities 11b. Additionally, the mode of arrangement also is not particularly limited. For example, the concave-convex structure 11c may be arranged by any one or more modes selected from among a lattice arrangement, a staggered arrangement, and a hexagonal close-packed arrangement. In the case in which the concave-convex structure 11c is arranged randomly, the arrangement of the concave-convex structure 11c may be an arrangement shifted from a periodic arrangement such as a lattice arrangement, a staggered arrangement, and a hexagonal close-packed arrangement. Although the amount of shift from the periodic arrangement is not particularly limited, the convexities 11a included in the concave-convex structure 11c, for example, may be shifted from the positions in the periodic arrangement by several micrometers, for example, approximately 1 to 5 μm, or approximately 2 to 4 μm.

Herein, in the case in which the concave-convex structure 11c is arranged periodically, by adjusting the area ratio A/B described below, the transmittance can be raised more reliably. The area ratio A/B will be described on the basis of FIGS. 12 and 13.

Figure 12:
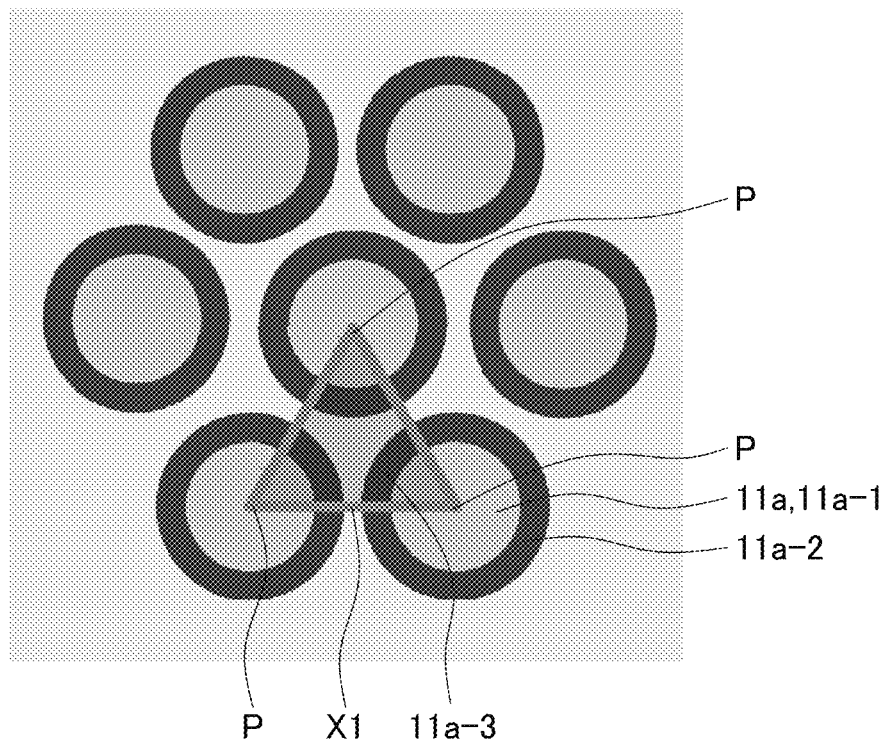
FIG. 12 is a plan-view diagram for explaining a preferable example of the present embodiment.
Figure 13:
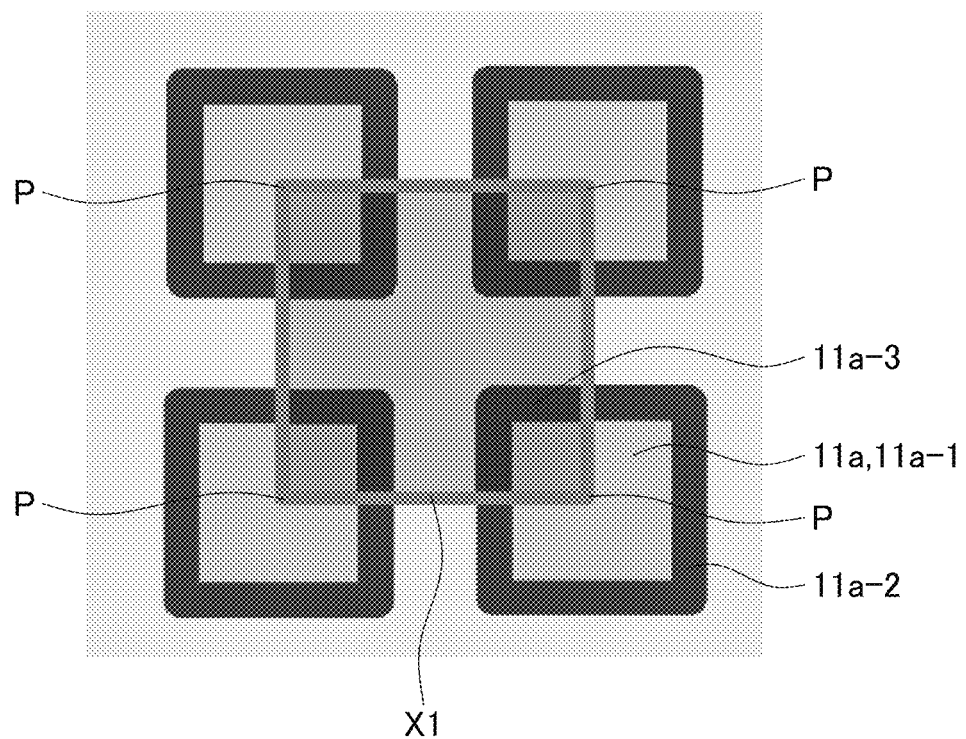
FIG. 13 is a plan-view diagram for explaining a preferable example of the present embodiment.

In the example of FIG. 12, the convexities 11a have a circular frustum shape. Furthermore, the convexities 11a are arranged regularly in a hexagonal close-packed arrangement. The minimum structural unit of the arrangement includes three convexities 11a adjacent to each other. By connecting their central axes P, a unit region X1 is obtained. In this example, since the central axes P form the vertices of an equilateral triangle, the unit region X1 is an equilateral triangle. Additionally, let B be the area (more specifically, the area of the plan view) of the unit region X1. Furthermore, let A be the area (more specifically, the area of the plan view) of a portion 11a-3 existing inside the unit region X1 in the tapered section 11a-2 included in the minimum structural unit. Additionally, the area ratio A/B is preferably 0.68 or less. With this arrangement, the transmittance of extraneous light can be set to 50% or greater. The area ratio A/B is more preferably 0.40 or less. In this case, the transmittance can be set to 65% or greater. In terms of practical usage, it is sufficient for the transmittance to be 50% or greater, and if 65% or greater, the image due to extraneous light can be displayed more vividly.

Note that the preferable range of the area ratio A/B does not depend on the type of frustum shape or the type of arrangement. In the example illustrated in FIG. 13, the convexities 11a have a regular quadrilateral frustum shape. Furthermore, the convexities 11a are arranged regularly in a lattice arrangement. In this example, there are four convexities 11a adjacent to each other. By connecting their central axes P, a unit region X1 is obtained. In this example, since the central axes P form the vertices of a regular quadrilateral, the unit region X1 is a regular quadrilateral.

Next, the correlation between the radius of curvature of the frustum shape and both the emitted luminance and transmittance will be described on the basis of FIG. 1. In the case in which tapered section 11a-2 is a spherical shape, the tapered section 11a-2 has some kind of radius of curvature. If the area of the plan view of the convexities 11a is kept constant, as the radius of curvature becomes larger, the area of the plan view of the tapered section 11a-2 becomes larger. On the other hand, the area of the plan view of the flat section 11a-1 becomes smaller. Consequently, the transmittance decreases, and the emitted luminance increases. In other words, the emitted luminance and the transmittance exist in a trade-off relationship with each other.

Figure 26:
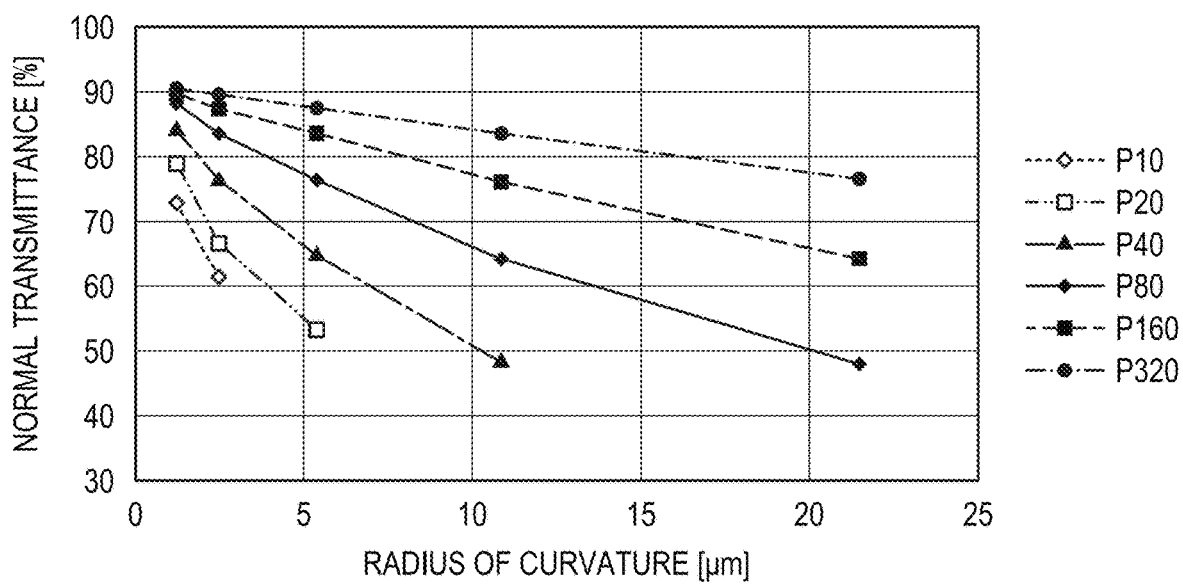
FIG. 26 is a graph illustrating an example of the optical properties of the optical body.
Figure 27:
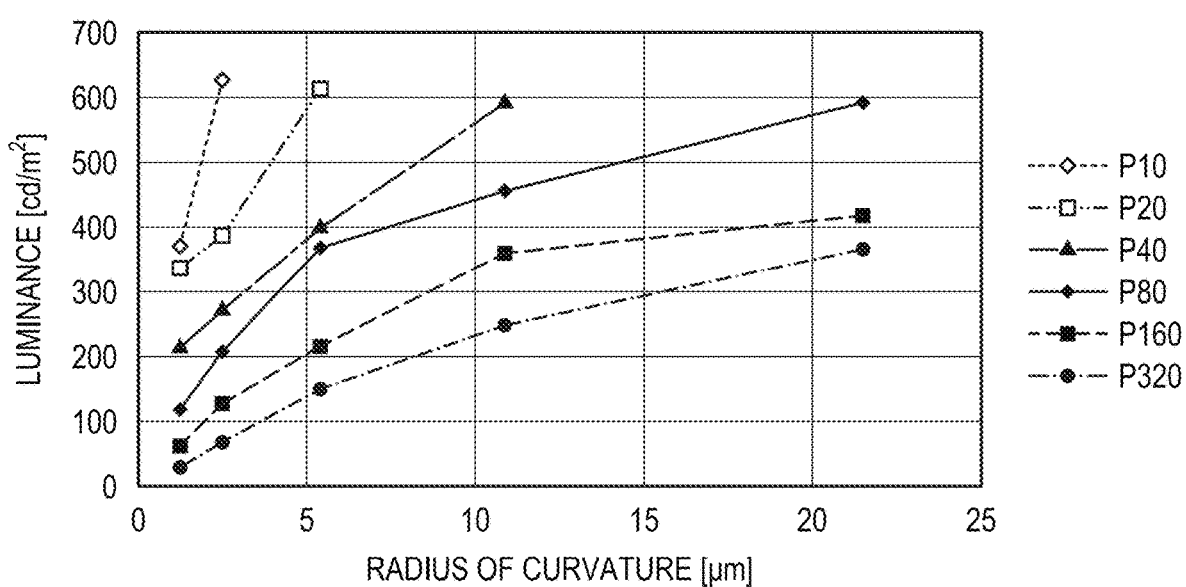
FIG. 27 is a graph illustrating an example of the optical properties of the optical body.

The inventors conducted a detailed investigation of the correlation between the radius of curvature of a frustum shape and both the emitted luminance and transmittance. Specifically, the inventors arranged the concave-convex structure 11c regularly, and investigated the correlation between the radius of curvature of the frustum structure and both the emitted luminance and transmittance. The inventors investigated the correlation by changing the pitch of the concave-convex structure 11c in various ways. As a result, it became apparent that, although there is some variation for each pitch, as the radius of curvature of the frustum structure becomes larger, the emitted luminance tends to increase, and the transmittance tends to decrease. Examples of the correlation are illustrated in FIGS. 26 and 27. In this example, the convexities 11a have a circular frustum shape.

Figure 28:
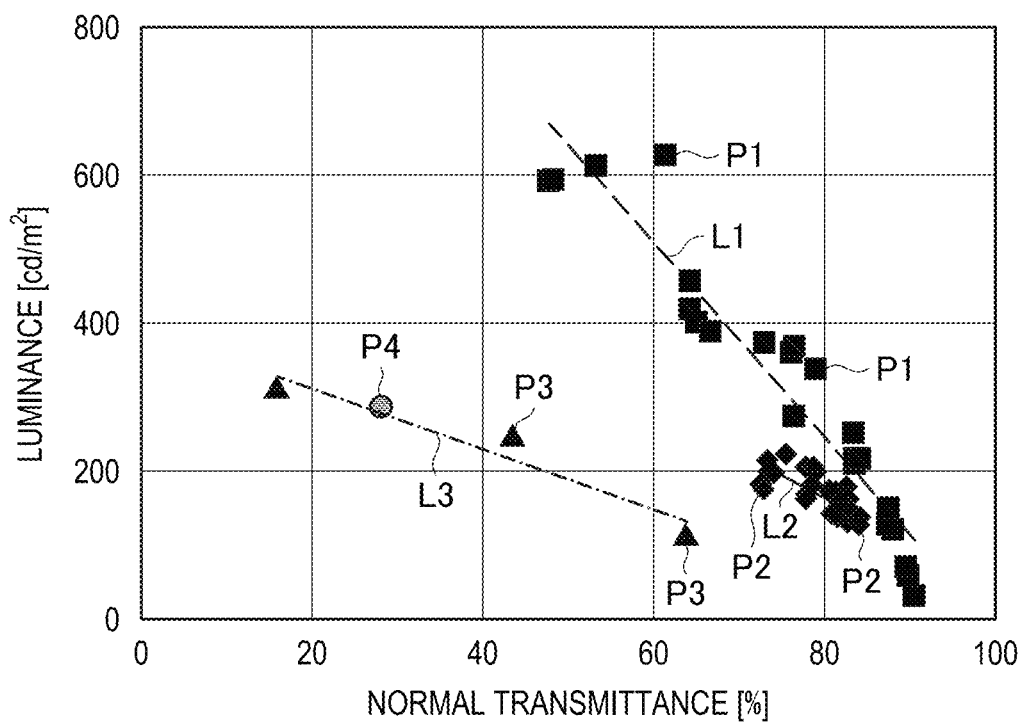
FIG. 28 is a graph illustrating an example of the optical properties of the optical body.

The inventors investigated the above correlation in further detail. As a result, the inventors discovered that the transmittance and the emitted luminance exist in a unique relationship, regardless of the radius of curvature and the pitch. Specifically, the inventors plotted the transmittance and the emitted luminance measured for each pitch of the concave-convex structure 11c and radius of curvature of the tapered section on an xy plane whose horizontal axis is the transmittance and whose vertical axis is the emitted luminance. Subsequently, an approximation line of these points was computed by the least squares method. As a result, an approximation line with an extremely high coefficient of correlation (0.9 or greater) was drawn. An example of the approximation line is illustrated in FIG. 28. In this example, the convexities 11a have a circular frustum shape. The point P1 indicates measured values of the transmittance and the emitted luminance, and the graph L1 indicates the approximation line.

Furthermore, the inventors changed the frustum shape of the convexities 11a to a regular hexagonal frustum and conducted a similar investigation. As a result, the inventors obtained a result similar to the above even when changing the frustum shape of the convexities 11a to a regular hexagonal frustum. However, the approximation line was different. As a result, the inventors discovered that if the type of frustum shape is the same (for example, if the frustum structure is a circular frustum shape), the transmittance and the emitted luminance exist in a unique relationship, regardless of the radius of curvature and the pitch. The correlation between the transmittance and the emitted luminance is different for each type of frustum shape.

As a result, the design of the concave-convex structure 11c is anticipated to be simple. For example, a graph illustrating the correlation between the radius of curvature of the frustum structure and both the emitted luminance and transmittance is created for each pitch and also for each type of frustum shape. At this point, since the emitted luminance also depends on the amount of light from the light source 20, the amount of light from the light source 20 is also recorded when measuring the emitted luminance. Additionally, an approximation line of the transmittance and the emitted luminance is computed for each type of frustum shape. Subsequently, if the transmittance and the emitted luminance demanded of the optical body 1 can be specified, the frustum shape, the radius of curvature, and the pitch satisfying these demands are decided on the basis of the above graph and the like. Specifically, the emitted luminance also varies according to the amount of light from the light source 20 paired with the optical body 1. Accordingly, a target value of the emitted luminance is corrected on the basis of the amount of light of the light source 20 when the graph was created and the amount of light of the light source 20 actually to be used. For example, in the case in which the amount of light of the light source 20 paired with the optical body 1 is greater than the amount of light when creating the graph, the target value of the emitted luminance may be decreased. Additionally, for example, a frustum shape capable of achieving the transmittance and the corrected emitted luminance demanded of the optical body 1 is decided on the basis of the above approximation line. Next, a radius of curvature and a pitch that satisfy the emitted luminance and the transmittance are specified on the basis of the graph illustrating the correlation between the radius of curvature of the frustum structure and both the emitted luminance and transmittance. In this decision process, it is preferable to account for a variety of constraints (such as constraints on the manufacturing process, cost, and yield, for example). With this arrangement, it is possible to design easily a concave-convex structure 11c capable of achieving the properties demanded of the optical body 1, while also accounting for a variety of constraints.

Further, the inventors set the shape of the convexities 11a to a circular frustum shape or deformed polygonal frustum shape, arranged the concave-convex structure 11c randomly (specifically, shifted the arrangement of the convexities 11a from a hexagonal close-packed arrangement within a range of 2 to 4 μm), and investigated the correlation between the emitted luminance and the transmittance. As a result, an approximation line with an extremely high coefficient of correlation (0.9 or greater) was drawn. An example of the approximation line is illustrated in FIG. 28. The point P2 indicates measured values of the transmittance and the emitted luminance, and the graph L2 indicates the approximation line. As a result, it was found out that, even in the case where the shape of the convexities 11a was set to a circular frustum shape or deformed polygonal frustum shape, and the concave-convex structure 11c was arranged randomly, the transmittance and the emitted luminance exist in a unique relationship. The relationship between the transmittance and the emitted luminance of an optical body of the related art is also illustrated in FIG. 28 for comparison. The point P3 is an example in which the light extraction section was subjected to embossing, and the point P4 is an example in which the light extraction section is a microlens array. The line L3 is an approximation line of the points P3 and P4. Embossing was performed by blasting a glass master using an alumina abrasive, and the microlens array is commercially available. As is apparent from FIG. 28, regardless of whether the shape of the convexities 11a is a deformed polygonal frustum shape or the arrangement of the concave-convex structure 11c is a periodic arrangement, light can be extracted with higher efficiency than in the example of the related art, and extraneous light can be transmitted. Furthermore, the light extraction section 11 of fine texture can be expressed, and when the optical body 1 is off, the light extraction section 11 is less visible, which results in improved transparency. That is, a light guide device such as a light guide panel or a light guide sheet in which such an optical body 1 is used can be provided. Furthermore, by arranging the concave-convex structure 11c randomly, setting the convexities 11a to a deformed polygonal frustum shape, or combining them, an emission line due to diffraction (diffracted light) can be restrained even if the light source 20 is implemented by a relatively inexpensive component such as a point light source. Thus, the design is made simple.

For example, the light extraction section 11 is produced by forming an uncured resin layer on the base material 10, and curing the resin layer while also transferring the concave-convex structure of a transfer mold to the resin layer. In this example, the transfer mold has the inverse shape of the concave-convex structure 11c. Also, the light extraction section 11 includes a cured curing resin. The cured curing resin is preferably transparent. The curing resin includes a polymerizable compound and a curing initiator. The polymerizable compound is a resin that is cured by the curing initiator. The polymerizable compound may be a compound such as a polymerizable epoxy compound or a polymerizable acrylic compound, for example. A polymerizable epoxy compound is a monomer, oligomer, or prepolymer having one or multiple epoxy groups in the molecule. Examples of polymerizable epoxy compounds include various bisphenol epoxy resins (such as bisphenol A and F), novolac epoxy resin, various modified epoxy resins such as rubber and urethane, naphthalene epoxy resin, biphenyl epoxy resin, phenol novolac epoxy resin, stilbene epoxy resin, triphenol methane epoxy resin, dicyclopentadiene epoxy resin, triphenyl methane epoxy resin, and prepolymers of the above.

A polymerizable acrylic compound is a monomer, oligomer, or prepolymer having one or multiple acrylic groups in the molecule. Herein, monomers are further classified into monofunctional monomers having one acrylic group in the molecule, bifunctional monomers having two acrylic groups in the molecule, and multifunctional monomers having three or more acrylic groups in the molecule.

Examples of "monofunctional monomers" include carboxylic acids (acrylic acids or the like), hydroxy monomers (2-hydroxyethyl acrylate, 2-hydroxypropyl acrylate, 4-hydroxybutyl acrylate), alkyl or alicyclic monomers (isobutyl acrylate, t-butyl acrylate, isooctyl acrylate, lauryl acrylate, stearyl acrylate, isobornyl acrylate, cyclohexyl acrylate), other functional monomers (2-methoxyethyl acrylate, methoxyethylene glycol acrylate, 2-ethoxyethyl acrylate, tetrahydrofurfuryl acrylate, benzyl acrylate, ethyl carbitol acrylate, phenoxyethyl acrylate, N,N-dimethylamino ethyl acrylate, N,N-dimethylamino propyl acrylamide, N,N-dimethyl acrylamide, acryloyl morpholine, N-isopropyl acrylamide, N,N-diethyl acrylamide, 2-(perfluorooctyl)ethyl acrylate, 3-perfluorohexyl-2-hydroxypropyl acrylate, 3-perfluorooctyl-2-hydroxypropyl-acrylate, 2-(perfluorodecyl) ethyl-acrylate, 2-(perfluoro-3-methylbutyl)ethyl acrylate), 2,4,6-tribromophenol acrylate, 2,4,6-tribromophenol methacrylate, 2-(2,4,6-tribromophenoxy)ethyl acrylate), and 2-ethylhexyl acrylate.

Examples of "bifunctional monomers" include tri(propylene glycol) di-acrylate, trimethylolpropane-diaryl ether, and urethane diacrylate.

Examples of "multifunctional monomers" include trimethylolpropane tri-acrylate, dipentaerythritol penta- and hexa-acrylate, and ditrimethylolpropane tetra-acylate.

Examples other than the polymerizable acrylic compounds listed above include acrylmorpholine, glycerol acrylate, polyether acrylates, N-vinylformamide, N-vinylcaprolactam, ethoxy diethylene glycol acrylate, methoxy triethylene glycol acrylate, polyethylene glycol acrylate, ethoxylated trimethylolpropane tri-acrylate, ethoxylated bisphenol A di-acrylate, aliphatic urethane oligomers, and polyester oligomers.

The curing initiator is a material that cures the curing resin. Examples of the curing initiator include thermal curing initiators and light-curing initiators, for example. The curing initiator may also be one that cures by some kind of energy beam other than heat or light (for example, an electron beam) or the like. In the case in which the curing initiator is a thermal curing initiator, the curing resin is a thermosetting resin, whereas in the case in which the curing initiator is a light-curing initiator, the curing resin is a light-curing resin.

Herein, from the perspective of transparency of the optical body 1, the curing initiator preferably is an ultraviolet-curing initiator. An ultraviolet-curing initiator is a type of light-curing initiator. Examples of ultraviolet-curing initiators include 2,2-dimethoxyl-1,2-diphenylethane-1-one, 1-hydroxy-cyclohexyl phenyl ketone, and 2-hydroxy-2-methyl-1-phenyl propane-1-one. Consequently, the curing resin preferably is an ultraviolet-curing resin. From the perspective of transparency, the curing resin more preferably is an ultraviolet-curing acrylic resin. It is sufficient to select the curing resin appropriately in consideration of the combination with the resin of the base material 10 (such as differences in the refractive index, the adhesion, and the like). For example, in the case in which the refractive index of the curing resin is greater than that of the base material 10, the amount of light incident on the convexities 11a (that is, the portion including the frustum shape) increases because of the effect of confining light to the light extraction section 11 due to total reflection at the interface between the base material 10 and the light extraction section 11, thereby making it possible to improve the light-emitting efficiency from the convexities 11a.

In addition, the light extraction section 11 may include a resin imparted with functionality such as hydrophilicity, water repellency, anti-fogging, and the like.

Additionally, additives may also be added to the light extraction section 11 depending on the purpose of the optical body 1. Examples of additives include inorganic fillers, organic fillers, leveling agents, surface conditioners, and antifoaming agents. Note that examples of types of inorganic fillers include metallic oxide particles such as $SiO_2$, $TiO_2$, $ZrO_2$, $SnO_2$, and $Al_2O_3$.

Figure 14:
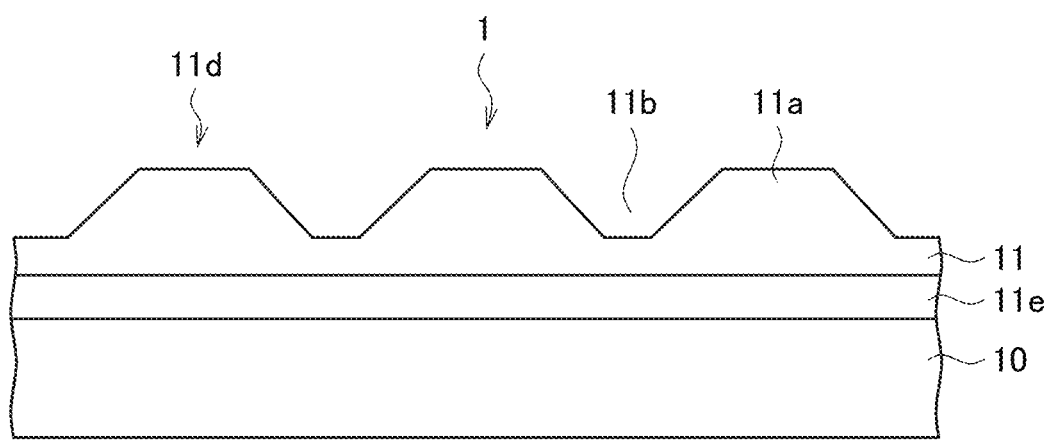
FIG. 14 is a lateral cross-section diagram illustrating a modification of the present embodiment.

The optical body 1 may also be produced by applying a film on which the light extraction section 11 is formed to the base material 10 by an adhesive layer. The adhesive layer is a transparent double-sided tape, for example. Also, as illustrated in FIG. 14, the transfer mold 11d may act as the light extraction section 11 directly, and the light extraction section 11 may be produced by being applied to the base material 10 by an adhesive layer 11e. In this case, the transfer mold preferably includes a transparent material, that is, the curing resin described above. The adhesive layer 11e is a transparent double-sided tape, for example.

In addition, the optical body 1 may also be formed in an integrated manner by injection molding. Also, the optical body 1 may be produced by forming the concave-convex structure 11c directly on the base material 10. However, although details will be described later, it is preferable to produce the optical body 1 by the manufacturing method described above (namely, the method of forming the light extraction section 11 separately on the base material 10).

In addition, on both sides of the base material 10, an anti-reflection structure may also be formed in regions where the light extraction section 11 is not formed. The anti-reflection structure may be a micro concave-convex structure in which the average cycle of concavities and convexities is lower than the visible light wavelengths, a laminated film (what is called an AR film) in which a high refractive index film and a low refractive index film are alternately laminated, or the like.

<2. Configuration of Light-Emitting Apparatus>

Next, the configuration of the light-emitting apparatus will be described on the basis of FIG. 1. The light-emitting apparatus includes the optical body 1 described above and the light source 20. The type of the light source 20 is not particularly specified, and is sufficiently a light source applied to a light guide panel of the related art. In other words, the light source 20 may be a light source that emits white light, or a light source that emits monochromatic light. The operation of the light-emitting apparatus is summarized below. First, light is incident on the optical body 1 from the light source 20. Light incident inside the optical body 1, or in other words, internally propagated light, propagates inside the optical body 1 while reflecting off both sides of the base material 10.

Part of the internally propagated light reaches the concave-convex structure 11c of the light extraction section 11. The internally propagated light reaching the concave-convex structure 11c reflects off the concave-convex structure 11c, and is extracted to the outside from the surface 10B. With this arrangement, the light-emitting region emits light. On the other hand, in the case in which the light source 20 is not emitting light, the light-emitting region of the optical body 1 does not emit light. In this case, the optical body 1 is capable of transmitting extraneous light with high transmittance.

<3. Method of Using Light-Emitting Apparatus>

Figure 15:
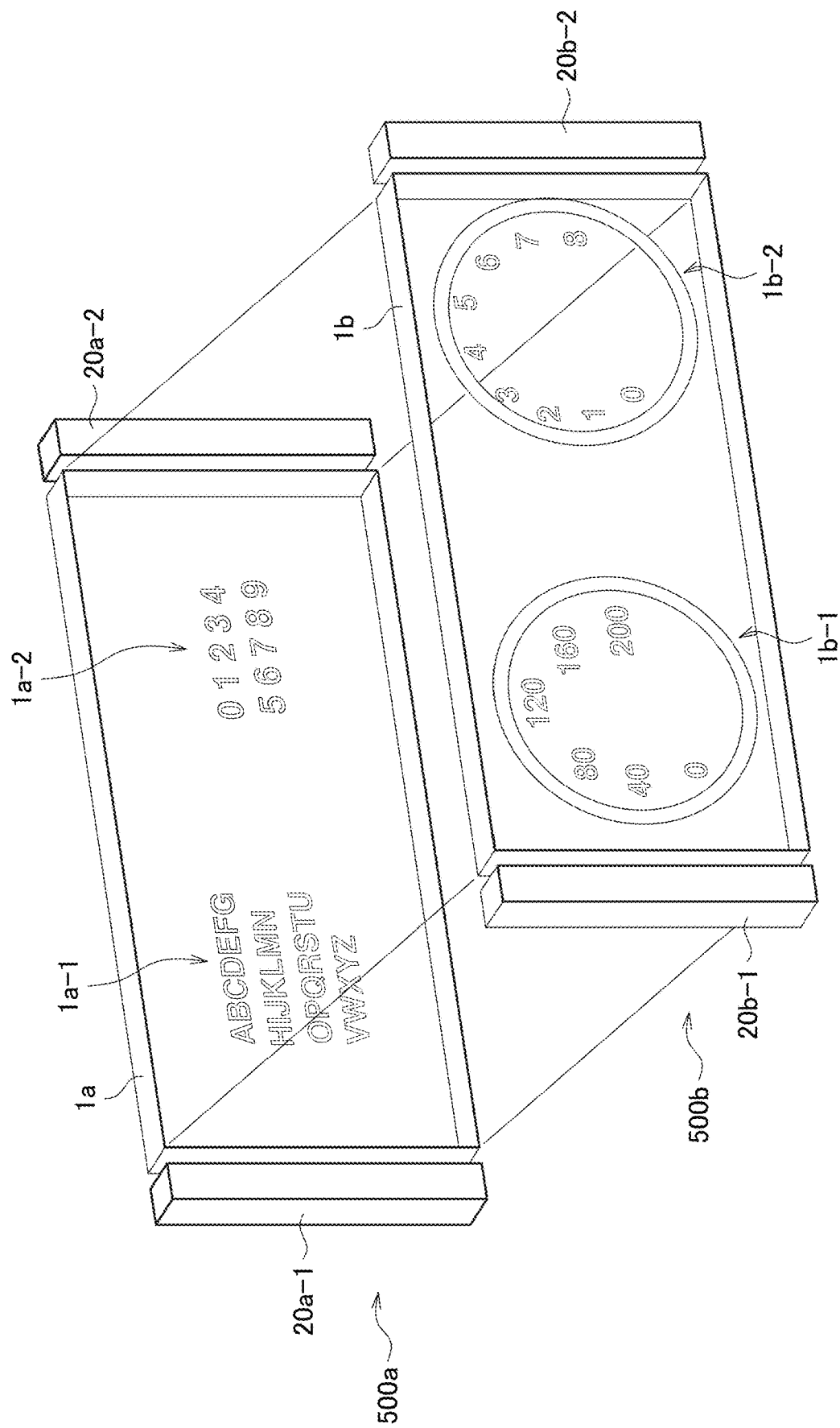
FIG. 15 is a perspective diagram illustrating an example of an image display apparatus in which optical bodies of the present embodiment are overlaid on top of each other.

Next, an example of an image display apparatus to which a light-emitting apparatus is applied will be described on the basis of FIGS. 15 to 17. As illustrated in FIG. 15, this image display apparatus has a configuration in which the light-emitting apparatuses 500a and 500b are overlaid onto each other. The light-emitting apparatus 500a includes an optical body 1a and light sources 20a-1 and 20a-2. The light-emitting apparatus 500b includes an optical body 1b and light sources 20b-1 and 20b-2. Therefore, the optical bodies 1 (1a, 1b) overlaid onto each other are used. The light-emitting apparatus 500a is arranged at the back side with respect to the light-emitting apparatus 500b as seen from the viewer. The optical bodies 1a and 1b are configured similarly to the optical body 1 described above. That is, light-emitting regions 1a-1 and 1a-2 are formed on the rear surface of the optical body 1a. The light extraction section 11 (that is, a concave-convex structure 11c) is formed on the light-emitting regions 1a-1 and 1a-2, and when the optical body 1a is turned on (that is, the light sources 20a-1 and 20a-2 are caused to emit light), the light-emitting regions 1a-1 and 1a-2 emit light. The light-emitting regions 1a-1 and 1a-2 each have a text shape (alphabets or numbers). Therefore, when the light-emitting regions 1a-1 and 1a-2 emit light, the light-emitting regions 1a-1 and 1a-2, that is, text images are seen.

Similarly, light-emitting regions 1b-1 and 1b-2 are formed on the rear surface of the optical body 1b. The light extraction section 11 (that is, the concave-convex structure 11c) is formed on the light-emitting regions 1b-1 and 1b-2, and when the optical body 1b is turned on (that is, the light sources 20b-1 and 20b-2 are caused to emit light), the light-emitting regions 1b-1 and 1b-2 emit light. The light-emitting regions 1b-1 and 1b-2 each have a meter shape (a speed meter or tachometer). Therefore, when the light-emitting regions 1b-1 and 1b-2 emit light, the light-emitting regions 1b-1 and 1b-2, that is, a speed meter image and a tachometer image are seen.

According to this image display apparatus, the light-emitting apparatuses 500a and 500b are overlaid onto each other, and are capable of displaying different types of information, respectively. Therefore, even in the case where the place where the image display apparatus is to be installed is narrow, and the image display apparatus needs to be reduced in size (for example, in the case where the image display apparatus is used as a vehicle display apparatus), various types of information can be displayed. Note that, obviously, three or more optical bodies 1 may be overlaid onto each other, or the optical body 1 may be used independently.

Figure 16A:
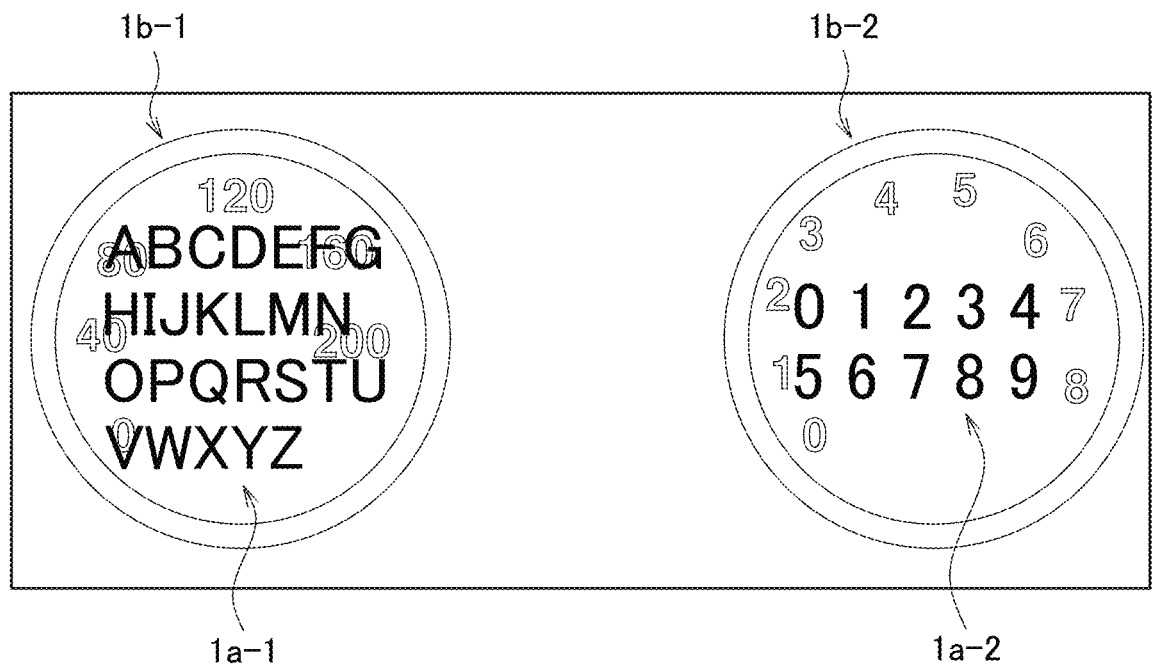
FIG. 16A is a front-view diagram illustrating an example of display presented by the image display apparatus.
Figure 16B:
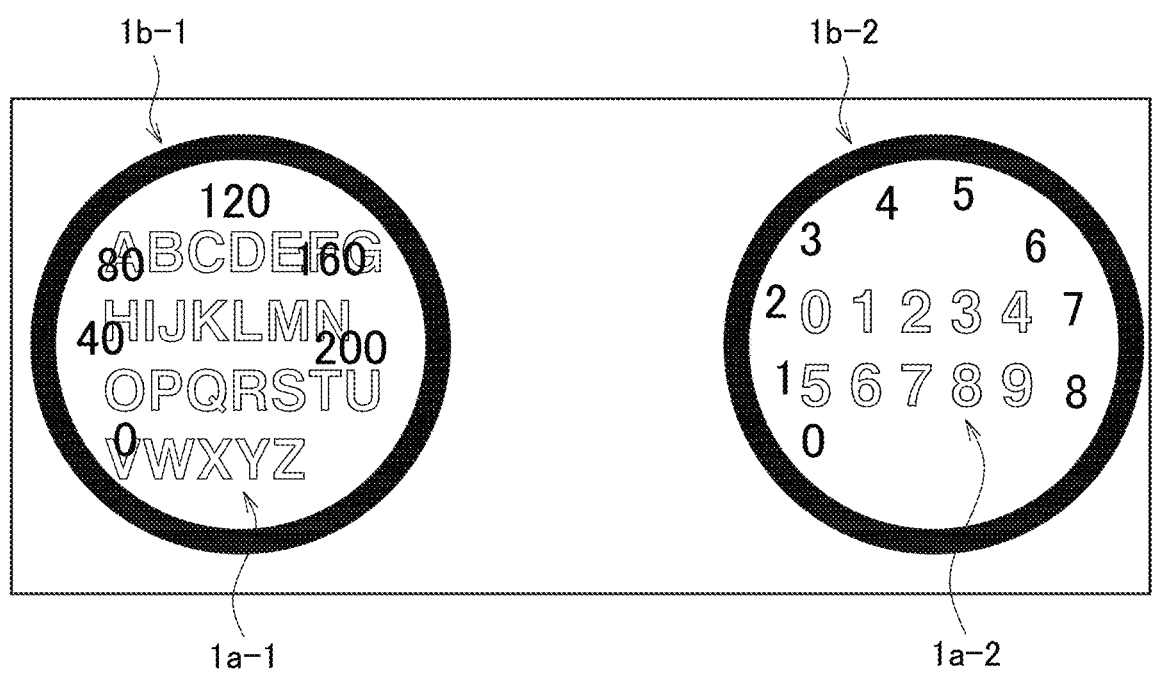
FIG. 16B is a front-view diagram illustrating an example of display presented by the image display apparatus.

FIGS. 16A and 16B illustrate display examples. In the example of FIG. 16A, the light-emitting apparatus 500a is on, and the light-emitting apparatus 500b is off. The concave-convex structure 11c forming the light-emitting regions 1b-1 and 1b-2 has the flat section 11a-1 as described above. Thus, the light-emitting regions 1b-1 and 1b-2 can transmit extraneous light (herein, extraneous light from the optical body 1a) with high transmittance. Therefore, the viewer hardly sees the light-emitting regions 1b-1 and 1b-2, but can substantially see only the light-emitting regions 1a-1 and 1a-2. Therefore, the viewer can easily understand information indicated by the light-emitting regions 1a-1 and 1a-2. Note that, in FIG. 16A, the light-emitting regions 1b-1 and 1b-2 are drawn with the outline in order to indicate that they exist, but actually they are hardly seen by the viewer.

In the example of FIG. 16B, the light-emitting apparatus 500b is on, and the light-emitting apparatus 500a is off. The concave-convex structure 11c forming the light-emitting regions 1a-1 and 1a-2 has the flat section 11a-1 as described above. Thus, the light-emitting regions 1a-1 and 1a-2 can transmit extraneous light (herein, extraneous light from the optical body 1b) with high transmittance. Therefore, the viewer hardly sees the light-emitting regions 1a-1 and 1a-2, but can substantially see only the light-emitting regions 1b-1 and 1b-2. Therefore, the viewer can easily understand information indicated by the light-emitting regions 1b-1 and 1b-2. Note that, in FIG. 16B, the light-emitting regions 1a-1 and 1a-2 are drawn with the outline in order to indicate that they exist, but actually they are hardly seen by the viewer.

Figure 17:
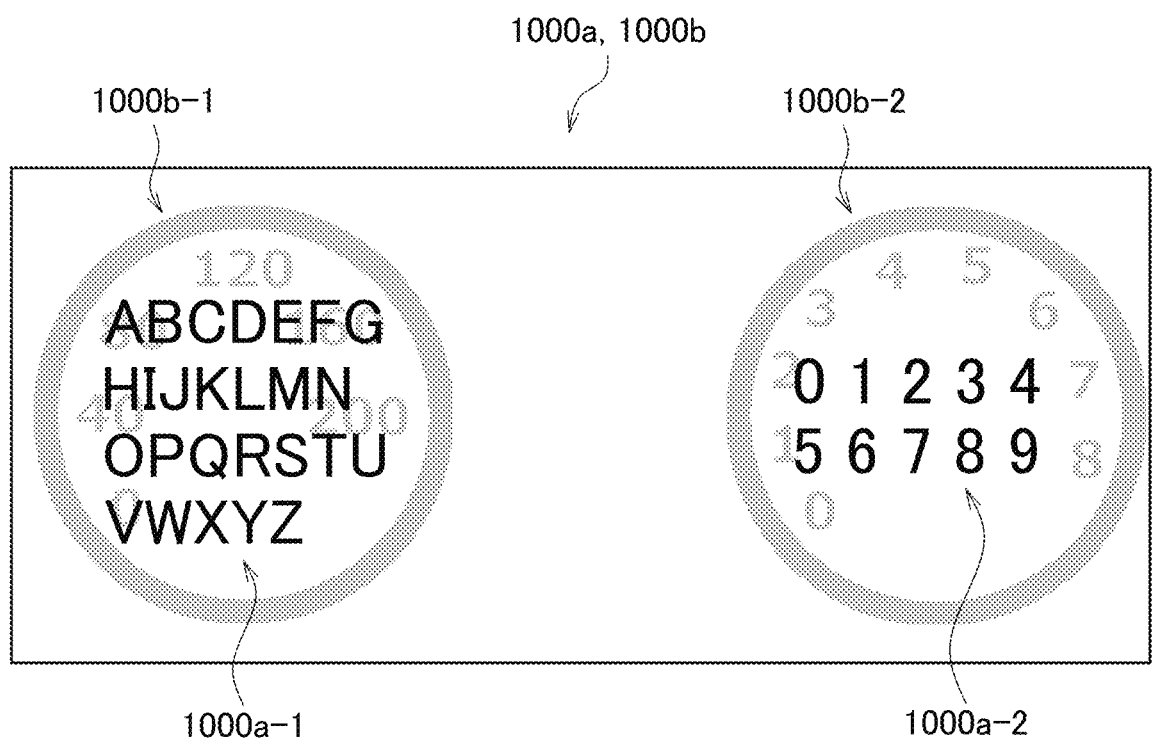
FIG. 17 is a front-view diagram illustrating an example of display presented by an image display apparatus in which optical bodies of a related art are overlaid on top of each other.

FIG. 17 illustrates an example in which the optical bodies 1000 (optical bodies 1000a and 1000b) of the related art are overlaid onto each other. The optical body 1000a has light-emitting regions 1000a-1 and 1000a-2, and the optical body 1000b has light-emitting regions 1000b-1 and 1000b-2. Concavities 1010 of microlens shape are formed in the light-emitting regions 1000a-1, 1000a-2, 1000b-1, and 1000b-2. In FIG. 17, the optical body 1000a is arranged at the back side with respect to the optical body 1000b as seen from the viewer. In addition, the optical body 1000a is on, and the optical body 1000b is off. Therefore, the light-emitting regions 1000a-1 and 1000a-2 of the optical body 1000a are emitting light. On the other hand, although the optical body 1000b is off, the concavities 1010 forming the light-emitting regions 1000b-1 and 1000b-2 scatter extraneous light (herein, extraneous light from the optical body 1000a). Therefore, the viewer also sees the light-emitting regions 1000b-1 and 1000b-2 that essentially should not be seen, in addition to the light-emitting regions 1000a-1 and 1000a-2. In FIG. 17, the light-emitting regions 1000b-1 and 1000b-2 are illustrated by hatching to indicate that they are seen. Thus, it is difficult for the viewer to understand information indicated by the light-emitting regions 1000a-1 and 1000a-2.

<4. Method for Manufacturing Optical Body>

Next, a method for manufacturing the optical body 1 will be described.

The method for manufacturing the optical body 1 includes a first step of producing a transfer mold having the inverse shape of the concave-convex structure 11c, a second step of forming an uncured resin layer on the surface of the base material, and a third step of curing the uncured resin layer while also transferring the concave-convex structure of the transfer mold to the cured resin layer.

(4-1. First Step)

Figure 18:
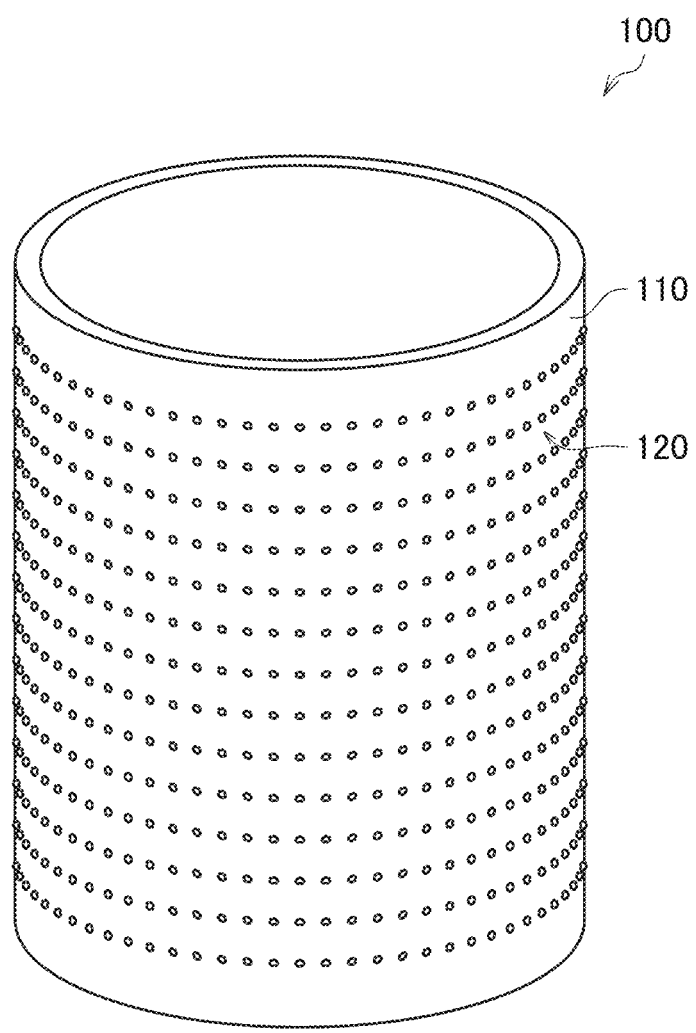
FIG. 18 is a perspective diagram illustrating an exemplary appearance of a master according to the present embodiment.

The first step is a step of producing a transfer mold having the inverse shape of the concave-convex structure 11c. The transfer mold is a master 100 illustrated in FIG. 18, for example.

(4-1-1. Configuration of Master)

Accordingly, the configuration of the master 100 will be described. The master 100 has a cylindrical shape. The master 100 may also have a round columnar shape, or another shape (for example, a planar shape). However, in the case in which the master 100 has a round columnar or cylindrical shape, a concave-convex structure (that is, a master concave-convex structure) 120 of the master 100 can be transferred seamlessly to a resin base material or the like by a roll-to-roll method. With this arrangement, the concave-convex structure 11c can be formed on the surface 10A of the base material 10 with high production efficiency. From such a perspective, the shape of the master 100 is preferably a cylindrical shape or a round columnar shape.

The master 100 is provided with a master base material 110, and the master concave-convex structure 120 formed on the circumferential surface of the master base material 110. The master base material 110 is a glass body, for example, and specifically is formed from quartz glass. However, the master base material 110 is not particularly limited insofar as the $SiO_2$ purity is high, and may also be formed from a material such as fused quartz glass or synthetic quartz glass. The master base material 110 may also be a laminate of the above materials on a metal matrix, or a metal matrix (for example, Cu, Ni, Cr, Al). The shape of the master base material 110 is a cylindrical shape, but may also be a round columnar shape, or another shape. However, as described above, the master base material 110 preferably has a cylindrical shape or a round columnar shape. The master concave-convex structure 120 has the inverse shape of the concave-convex structure 11c.

(4-1-2. Method of Manufacturing Master)

Next, a method of manufacturing the master 100 will be described. First, a base material resist layer is formed (deposited) on the master base material 110. At this point, the resist constituting the base material resist layer is not particularly limited, and may be either an organic resist material or an inorganic resist material. Examples of organic resist materials include novolac-type resist and chemically-amplified resist. Also, examples of inorganic resist materials include metallic oxides including one or multiple types of transition metals such as tungsten (W) or molybdenum (Mo). Other examples of inorganic resist materials include Cr, Au, and the like. However, in order to conduct thermal reaction lithography, the base material resist layer preferably is formed with a thermo-reactive resist including a metallic oxide.

Figure 20A:
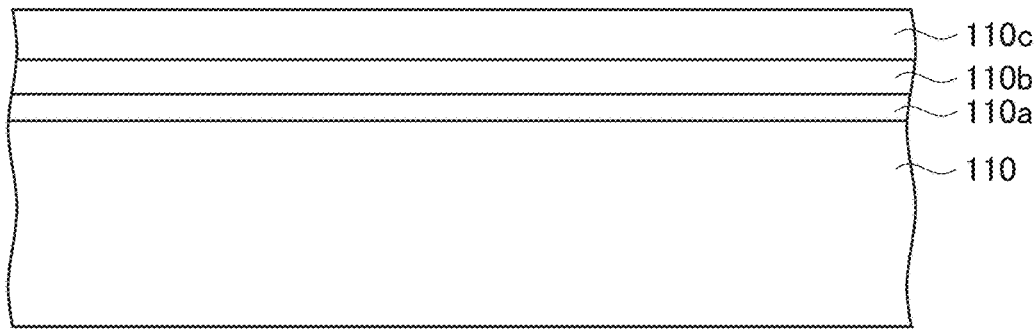
FIG. 20A is a lateral cross-section diagram for explaining a concave-convex structure master production step.

In the case of using an organic resist material, the base material resist layer may be formed on the master base material 110 by using a process such as spin coating, slit coating, dip coating, spray coating, or screen printing. Also, in the case of using an inorganic resist material for the base material resist layer, the base material resist layer may be formed by sputtering. An organic resist material and an inorganic resist material may also be used together. For example, as illustrated in FIG. 20A, a first inorganic resist layer (for example, Cr) 110a, a second inorganic resist layer (for example, Au) 110b, and an organic resist layer 110c may be layered.

Next, by exposing part of the base material resist layer with an exposure device 200 (see FIG. 19), a latent image is formed on the base material resist layer. Specifically, the exposure device 200 modulates laser light 200A, and irradiates the base material resist layer with the laser light 200A. Consequently, part of the base material resist layer irradiated by the laser light 200A denatures, and thus a latent image corresponding to the master concave-convex structure 120 may be formed in the base material resist layer.

Next, by dripping a developing solution onto the base material resist layer in which the latent image is formed, the base material resist layer is developed. As a result, a concave-convex structure is formed in the base material resist layer. Subsequently, by etching the master base material 110 and the base material resist layer using the base material resist layer as a mask, the master concave-convex structure 120 is formed on the master base material 110. Note that although the etching method is not particularly limited, dry etching that is vertically anisotropic is preferable. For example, reactive ion etching (RIE) is preferable. By the above steps, the master 100 is produced. The etching may be wet etching.

(4-1-3. Configuration of Exposure Device)

Figure 19:
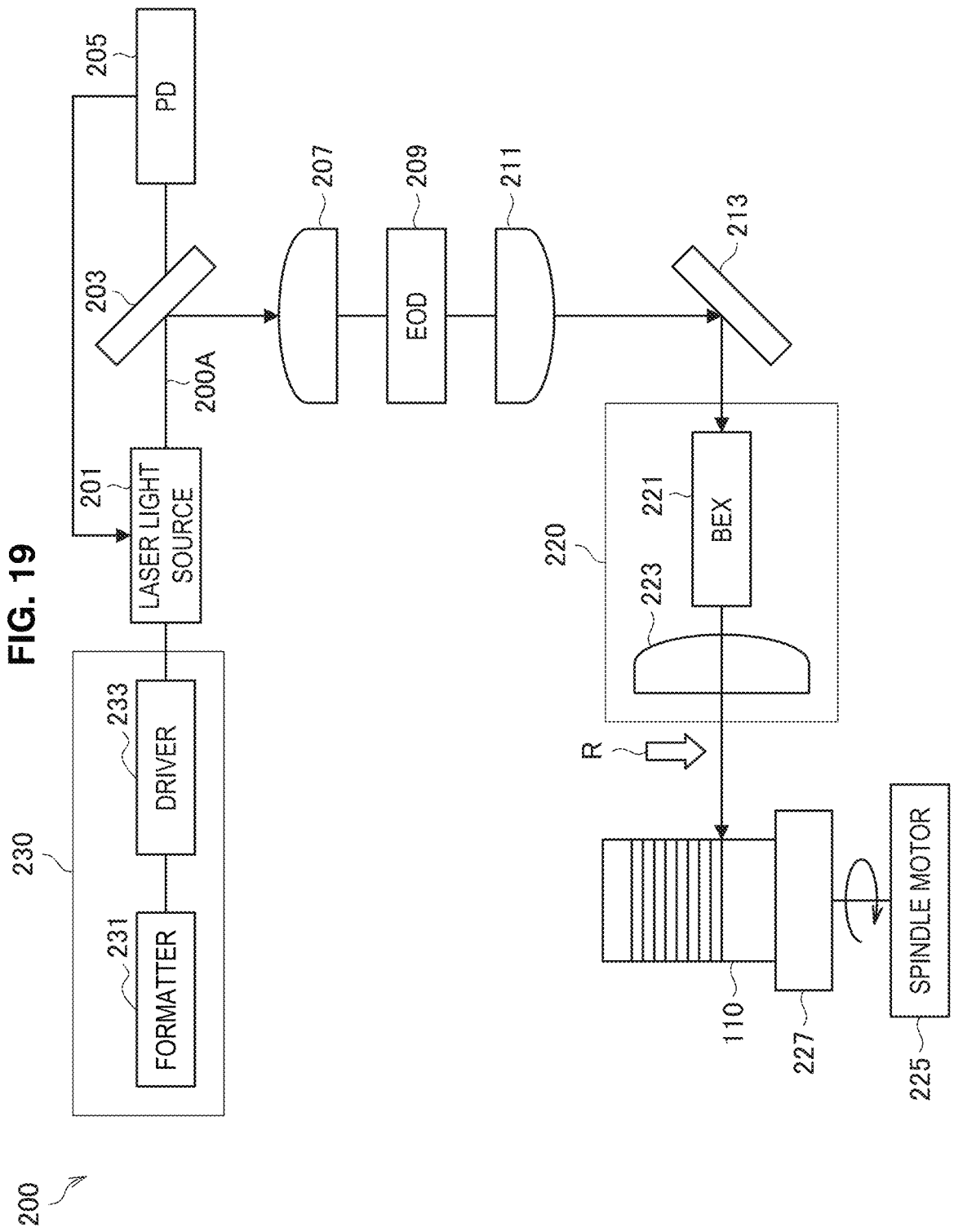
FIG. 19 is a block diagram illustrating an exemplary configuration of an exposure device.

Next, the configuration of the exposure device 200 will be described on the basis of FIG. 19. The exposure device 200 is a device that exposes the base material resist layer. The exposure device 200 is provided with a laser light source 201, a first mirror 203, a photodiode (PD) 205, a deflecting optical system, a control mechanism 230, a second mirror 213, a movable optical table 220, a spindle motor 225, and a turntable 227. Also, the master base material 110 is placed on the turntable 227 and is capable of rotating.

The laser light source 201 is a light source that emits laser light 200A, and is a device such as a solid-state laser or a semiconductor laser, for example. The wavelength of the laser light 200A emitted by the laser light source 201 is not particularly limited, but may be a wavelength in the blue light band from 400 nm to 500 nm, for example. Also, it is sufficient for the spot diameter of the laser light 200A (the diameter of the spot radiated onto the resist layer) to be smaller than the diameter of the open face of a concavity of the master concave-convex structure 120, such as approximately 200 nm, for example. The laser light 200A emitted from the laser light source 201 is controlled by the control mechanism 230.

The laser light 200A emitted from the laser light source 201 advances directly in a collimated beam, reflects off the first mirror 203, and is guided to the deflecting optical system.

The first mirror 203 is made up of a polarizing beam splitter, and has a function of reflecting one polarized component, and transmitting the other polarized component. The polarized component transmitted through the first mirror 203 is detected by the photodiode 205 and photoelectrically converted. Also, the photodetection signal photoelectrically converted by the photodiode 205 is input into the laser light source 201, and the laser light source 201 conducts phase modulation of the laser light 200A on the basis of the input photodetection signal.

In addition, the deflecting optical system is provided with a condenser lens 207, an electro-optic deflector (EOD) 209, and a collimator lens 211.

In the deflecting optical system, the laser light 200A is condensed onto the electro-optic deflector 209 by the condenser lens 207. The electro-optic deflector 209 is an element capable of controlling the radiation position of the laser light 200A. With the electro-optic deflector 209, the exposure device 200 is also capable of changing the radiation position of the laser light 200A guided onto the movable optical table 220 (what is called a Wobble mechanism). After the radiation position is adjusted by the electro-optic deflector 209, the laser light 200A is converted back into a collimated beam by the collimator lens 211. The laser light 200A exiting the deflecting optical system is reflected by the second mirror 213, and guided level with and parallel to the movable optical table 220.

The movable optical table 220 is provided with a beam expander (BEX) 221 and an objective lens 223. The laser light 200A guided to the movable optical table 220 is shaped into a desired beam shape by the beam expander 221, and then radiated via the objective lens 223 onto the base material resist layer formed on the master base material 110. In addition, the movable optical table 220 moves by one feed pitch (track pitch) in the direction of the arrow R (feed pitch direction) every time the master base material 110 undergoes one rotation. The master base material 110 is placed on the turntable 227. The spindle motor 225 causes the turntable 227 to rotate, thereby causing the master base material 110 to rotate. With this arrangement, the laser light 200A is made to scan over the base material resist layer. At this point, a latent image of the base material resist layer is formed along the scanning direction of the laser light 200A.

In addition, the control mechanism 230 is provided with a formatter 231 and a driver 233, and controls the radiation of the laser light 200A. The formatter 231 generates a modulation signal that controls the radiation of the laser light 200A, and the driver 233 controls the laser light source 201 on the basis of the modulation signal generated by the formatter 231. As a result, the irradiation of the master base material 110 by the laser light 200A is controlled.

The formatter 231 generates a control signal for irradiating the base material resist layer with the laser light 200A, on the basis of an input image depicting an arbitrary pattern to be drawn on the base material resist layer. Specifically, first, the formatter 231 acquires an input image depicting an arbitrary draw pattern to be drawn on the base material resist layer. The input image is an image corresponding to a development of the outer circumferential surface of the base material resist layer, in which the outer circumferential surface of the base material resist layer is cut in the axial direction and expanded in a single plane. In the development view, an image corresponding to the circumferential shape of the master 100 is drawn. This image illustrates the inverse shape of the concave-convex structure 11c. Note that a transfer film to which the master concave-convex structure 120 of the master 100 has been transferred may be produced, and the concave-convex structure 11c may be formed on the base material 10 using the transfer film as a transfer mold. In this case, the master concave-convex structure 120 has the same concave-convex structure as the concave-convex structure 11c.

Next, the formatter 231 partitions the input image into sub-regions of a predetermined size (for example, partitions the input image into a lattice), and determines whether or not the concavity draw pattern (in other words, a pattern corresponding to the concavities of the master 100) is included in each of the sub-regions. Subsequently, the formatter 231 generates a control signal to perform control to irradiate with the laser light 200A each sub-region determined to include the concavity draw pattern. The control signal (that is, the exposure signal) preferably is synchronized with the rotation of the spindle motor 225, but does not have to be synchronized. In addition, the control signal and the rotation of the spindle motor 225 may also be resynchronized every time the master base material 110 performs one rotation. Furthermore, the driver 233 controls the output of the laser light source 201 on the basis of the control signal generated by the formatter 231. As a result, the irradiation of the base material resist layer by the laser light 200A is controlled. Note that the exposure device 200 may also perform a known exposure control process, such as focus servo and positional correction of the irradiation spot of the laser light 200A. The focus servo may use the wavelength of the laser light 200A, or use another wavelength for reference.

In addition, the laser light 200A radiated from the laser light source 201 may irradiate the base material resist layer after being split into multiple optical subsystems. In this case, multiple irradiation spots are formed on the base material resist layer. In this case, when the laser light 200A emitted from one optical system reaches the latent image formed by another optical system, exposure may be ended.

Consequently, according to the present embodiment, a latent image corresponding to the draw pattern of the input image can be formed in the resist layer. Additionally, by developing the resist layer and using the developed resist layer as a mask to etch the master base material 110 and the base material resist layer, the master concave-convex structure 120 corresponding to the draw pattern of the input image is formed on the master base material 110. In other words, an arbitrary master concave-convex structure 120 corresponding to a draw pattern can be formed. Consequently, if a draw pattern in which the inverse shape of the optical body 1 is drawn is prepared as the draw pattern, the master concave-convex structure 120 having the inverse shape of the optical body 1 can be formed.

Figure 20B:
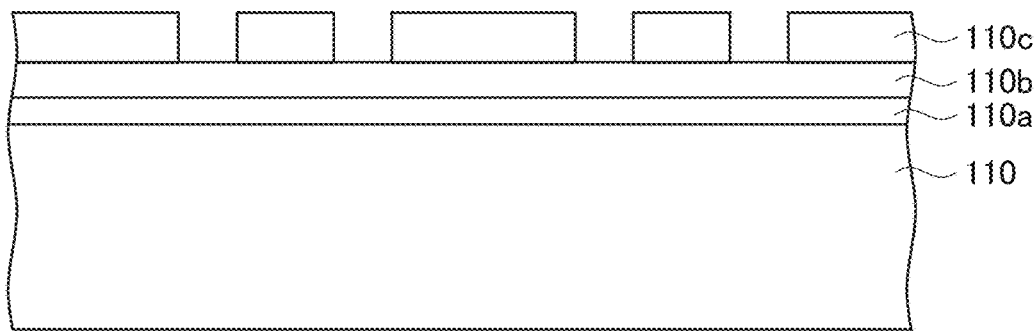
FIG. 20B is a lateral cross-section diagram for explaining a concave-convex structure master production step.
Figure 20C:
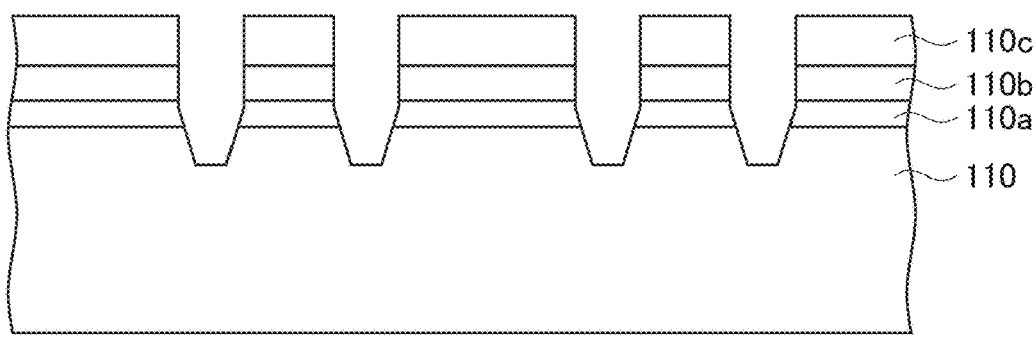
FIG. 20C is a lateral cross-section diagram for explaining a concave-convex structure master production step.
Figure 20D:
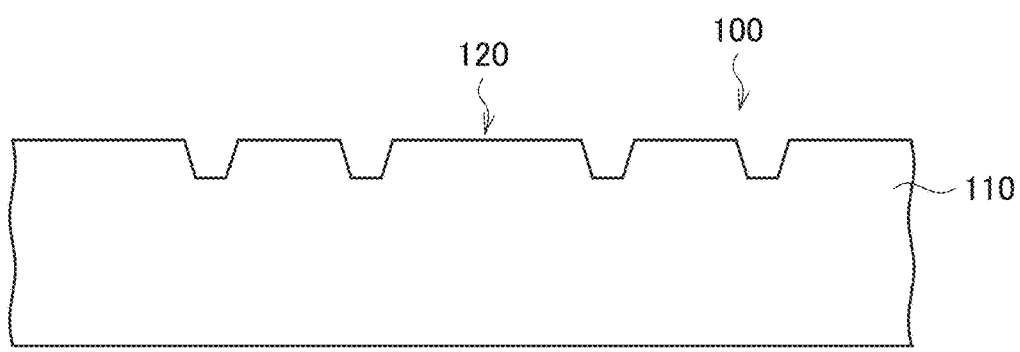
FIG. 20D is a lateral cross-section diagram for explaining a concave-convex structure master production step.

For example, in the case of forming the resist layer illustrated in FIG. 20A on the master base material 110, first, as illustrated in FIG. 20B, development after exposure is performed. Next, as illustrated in FIG. 20C, each resist layer is etched successively. Finally, the master base material 110 is etched. Next, as illustrated in FIG. 20D, the resist layers are removed.

Note that the exposure device usable in the present embodiment is not limited to the exposure device 200, and any type of exposure device having functions similar to those of the exposure device 200 may be used.

(4-1-4. Method for Forming Concave-Convex Structure Using Master)

Figure 21:
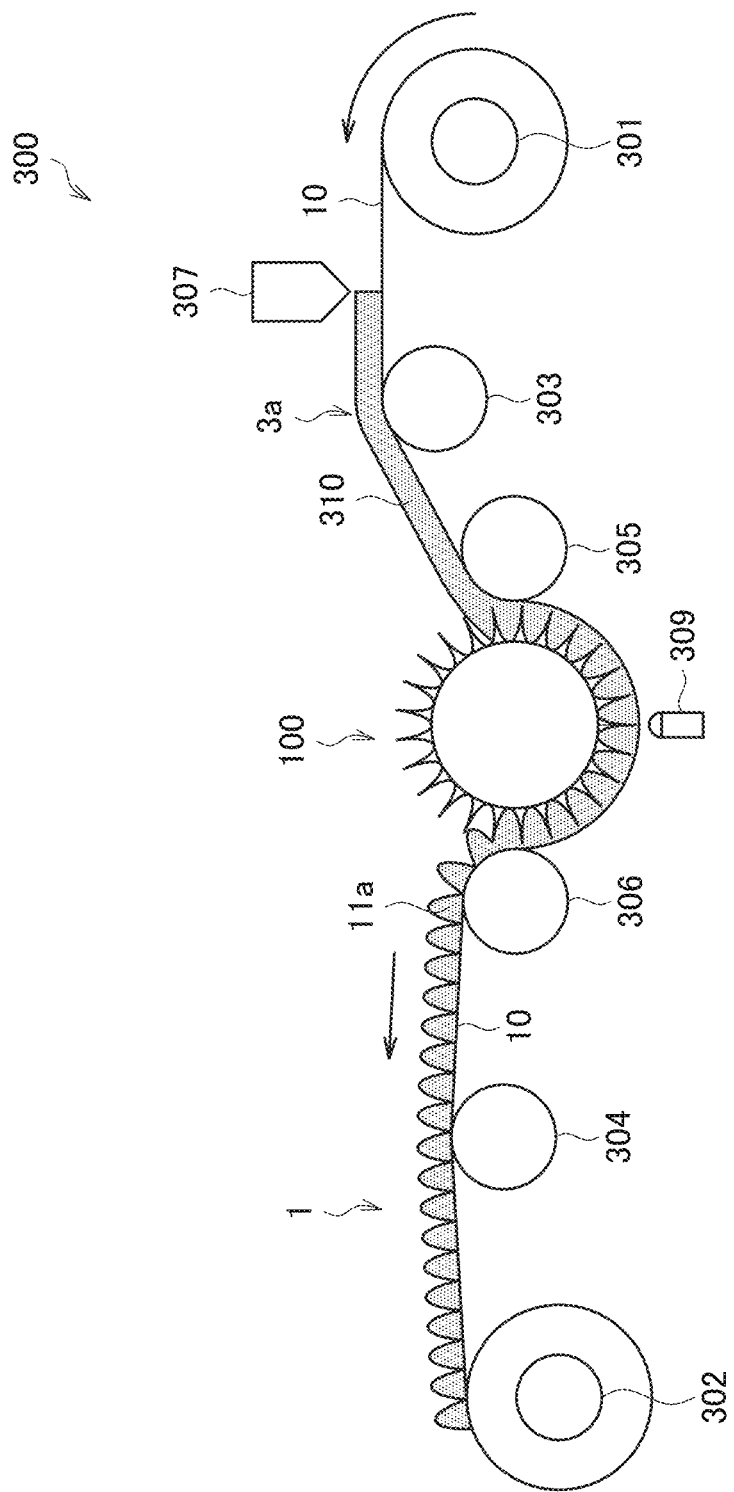
FIG. 21 is a schematic diagram illustrating an example of a transfer device that manufactures an optical body by roll-to-roll.

Next, FIG. 21 will be referenced to describe an example of a method for forming the concave-convex structure 11c using the master 100. The concave-convex structure 11c can be formed on the base material 10 by a roll-to-roll transfer device 300 using the master 100. In the transfer device 300 illustrated in FIG. 21, the optical body 1 is produced using a light-curing resin (ultraviolet-curing resin). The second and third steps described above are performed using the transfer device 300.

The transfer device 300 is provided with the master 100, a base material supply roll 301, a take-up roll 302, guide rolls 303 and 304, a nip roll 305, a separation roll 306, an applicator device 307, and a light source 309.

The base material supply roll 301 is a roll around which a long-length base material 10 is wound in a roll, while the take-up roll 302 is a roll that takes up the optical body 1. Also, the guide rolls 303 and 304 are rolls that transport the base material 10. The nip roll 305 is a roll that puts the base material 10 laminated with an uncured resin layer 310, or in other words a transfer film 3a, in close contact with the master 100. The separation roll 306 is a roll that separates the optical body 1 from the master 100.

The applicator device 307 is provided with applicator means such as a coater, and applies an uncured light-curing resin composition to the base material 10, and forms the uncured resin layer 310. The applicator device 307 may be a device such as a gravure coater, a wire bar coater, or a die coater, for example. Also, the light source 309 is a light source that emits light of a wavelength at which the light-curing resin composition can be cured, and may be a device such as an ultraviolet lamp, for example.

In the transfer device 300, first, the base material 10 is delivered continuously from the base material supply roll 301 via the guide roll 303. Note that partway through the delivery, the base material supply roll 301 may also be changed to a base material supply roll 301 of a separate lot. The uncured light-curing resin composition is applied by the applicator device 307 to the delivered base material 10, and the uncured resin layer 310 is laminated onto the base material 10. As a result, the transfer film 3a is prepared. The transfer film 3a is put into close contact with the master 100 by the nip roll 305. The light source 309 irradiates with light the uncured resin layer 310 put in close contact with the master 100, thereby curing the uncured resin layer 310. With this arrangement, the master concave-convex structure 120 formed on the outer circumferential face of the master 100 is transferred to the uncured resin layer 310. In other words, the concave-convex structure 11c having the inverse shape of the master concave-convex structure 120 is formed on the base material 10. Next, the base material 10 in which the concave-convex structure 11c is formed is separated from the master 100 by the separation roll 306. Next, the base material 10 in which the concave-convex structure 11c is formed is taken up by the take-up roll 302 via the guide roll 304. Note that the master 100 may be oriented vertically or oriented horizontally, and a mechanism that corrects the angle and eccentricity of the master 100 during rotation may also be provided separately. For example, an eccentric tilt mechanism may be provided in a chucking mechanism. The transfer may also be performed by pressure transfer.

In this way, in the transfer device 300, the circumferential shape of the master 100 is transferred to the transfer film 3a while transporting the transfer film 3a roll-to-roll. With this arrangement, the concave-convex structure 11c is formed on the base material 10.

Note that in the case of using a thermoplastic resin film as the base material 10, the applicator device 307 and the light source 309 become unnecessary. In this case, a heater device is disposed farther upstream than the master 100. The base material 10 is heated and softened by the heater device, and after that, the base material 10 is pressed against the master 100. With this arrangement, the master concave-convex structure 120 formed on the circumferential face of the master 100 is transferred to the base material 10. Note that a film including a resin other than a thermoplastic resin may be used as the base material 10, and the base material 10 and a thermoplastic resin film may be laminated. In this case, the laminated film is pressed against the master 100 after being heated by the heater device. Consequently, the transfer device 300 is capable of continuously producing a transfer product in which the concave-convex structure 11c is formed on the base material 10.

Also, a transfer film to which the master concave-convex structure 120 of the master 100 has been transferred may be produced, and the concave-convex structure 11c may be formed on the base material 10 using the transfer film as a transfer mold. A transfer film to which the concave-convex structure of the transfer film has been transferred again may also be treated as a transfer mold. Also, the master 100 may be duplicated by electroforming, thermal transfer, or the like, and the duplicate may be used as a transfer mold. Furthermore, the shape of the master 100 is not necessarily limited to a roll shape, and may also be a planar master. Besides the method of irradiating resist with the laser light 200A, various processing methods can be selected, such as semiconductor exposure using a mask, electron beam lithography, machining, or anodic oxidation. Also, a resin film on which the concave-convex structure 11c has been formed by the manufacturing methods described above may also be applied to both sides of the base material 10.

In this way, the concave-convex structure 11c is formed on the base material 10 by transferring the concave-convex structure of the master 100 (or a transfer film to which the master concave-convex structure 120 has been transferred) onto the base material 10. In the present embodiment, by forming the light extraction section 11 on the base material 10 by the above method, it is possible to form the light extraction section 11 on the base material 10 with an arbitrary shape and material. Consequently, it is possible to accommodate low-volume/high-variation production easily. In contrast, in the case in which the optical body 1 is formed in an integrated manner by injection molding, it is necessary to prepare a metal mold for every shape of the base material. Consequently, it is difficult to accommodate low-volume/high-variation production.

Note that in the case of forming a micro concave-convex structure as an anti-reflection structure, the micro concave-convex structure can be formed on the base material 10 according to a method similar to the above. In this case, it is sufficient to form the inverse shape of the concave-convex structure 11c and the inverse shape of the micro concave-convex structure in the transfer mold.

EXAMPLES

1. Example 1

Next, examples of the present embodiment will be described. In Example 1, the optical body 1 was produced according to the following steps.

(1-1. Preparation of Base Material)

As the base material 10, an acrylic panel (Acrylite EX, made by Mitsubishi Rayon Co., Ltd.) with a thickness of 3 mm was prepared.

(1-2. Production of Optical Body)

By performing the first to third steps described above, the optical body 1 was produced. Specifically, the master base material 110 made of glass was prepared, and the master 100 was produced by the first step described above. Herein, the resist layer illustrated in FIG. 20A was used as the base material resist layer. A Cr layer was used as the first inorganic resist layer 110a, and an Au layer was used as the second inorganic resist layer 110b. The Cr layer and the Au layer were formed by sputtering. THMR-IP3250 made by Tokyo Ohka Kogyo Co., Ltd was used as the material included in the organic resist layer. As an exposure device corresponding to the exposure device 200, the NSR-4425i made by Nikon Corporation was used. NMD-3 made by Tokyo Ohka Kogyo Co., Ltd. was used as the developing solution, GE8111 made by Transene Company, Inc. was used as the Au etching solution, CR100 made by Hayashi Pure Chemical Ind., Ltd. was used as the Cr etching solution, and a 50% by mass aqueous solution of hydrofluoric acid made by Stella Chemifa Corporation, further diluted in water (to a concentration of 5% by mass after dilution), was used as the glass etching solution.

Next, a transfer film was produced, on which the master concave-convex structure of the master 100 was transferred. Specifically, the transfer device 300 illustrated in FIG. 21 was used to produce a transfer film in which the master concave-convex structure of the master 100 was transferred onto one surface of a polyester film made by Toyobo Co., Ltd. with a thickness of 125 μm. Herein, the ultraviolet-curing acrylic resin composition SK1120 made by Dexerials Corporation was used as the light-curing resin composition. Additionally, the concave-convex structure 11c was formed on the surface 10A of the base material 10, using the transfer film as a transfer mold. Specifically, as the ultraviolet-curing acrylic resin composition, a composition mixing UVX6366 made by Toagosei Co., Ltd. and Viscoat #150 made by Osaka Organic Chemical Industry Ltd. in a 1:1 mass ratio was prepared. By coating the surface 10A of the base material 10 with this ultraviolet-curing acrylic resin composition, an uncured resin layer was formed. Next, the concave-convex structure of the transfer film was transferred onto the uncured resin layer, and the uncured resin layer was cured.

Figure 22:
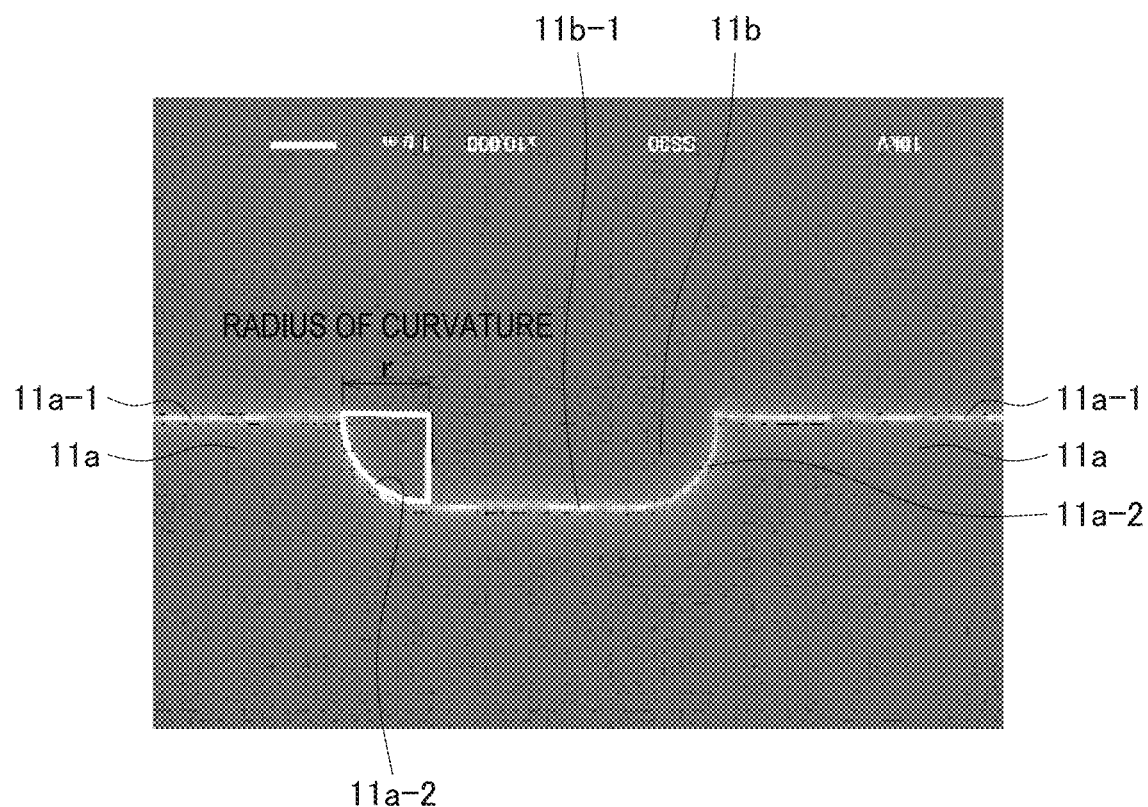
FIG. 22 is a cross-section SEM photograph illustrating an example of the concave-convex structure.
Figure 23:
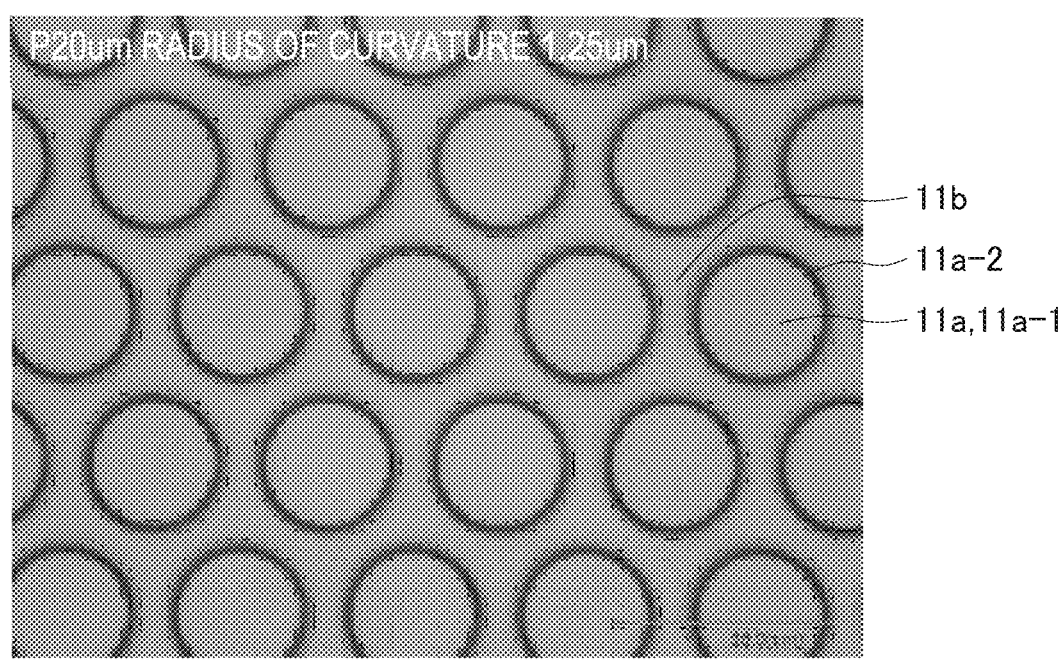
FIG. 23 is a plan-view optical micrograph illustrating an example of the concave-convex structure.

By the above steps, the optical body 1 was produced. In the optical body 1 according to Example 1, the convexities 11a have a circular frustum shape, and the tapered section 11a-2 is spherical. The radius of curvature of the tapered section 11a-2 was set to 1.25 μm, the diameter in the plan view of the convexities 11a was set to 15 μm, the fill ratio was set to 80%, the arrangement was set to a regular hexagonal close-packed arrangement, and the pitch was set to 20 μm. The width of the concavities 11b (the plan-view length of the portion interposed between adjacent convexities 11a) was set to 2.5 μm. FIG. 22 illustrates a cross-section SEM photograph (magnification ×10,000) of the concave-convex structure 11c, and FIG. 23 illustrates a plan-view optical micrograph (magnification ×2,090) of the concave-convex structure 11c.

(1-3. Measurement of Luminance and Transmittance)

Next, the luminance when causing the optical body 1 to emit light was measured. Measurement was performed by the following steps. Note that measurement was performed in a dark environment. First, an LED light source (LPAC1-2430NCW-R24 made by Altec System Co., Ltd.) was installed on an edge in the row direction side of the optical body 1. Also, a luminance meter (Konica Minolta CS-1000) was installed on the surface 10B side. The installation position was set to a position 50 cm away from the surface 10B, with the optical axis of the luminance meter perpendicular to the surface 10B. Next, bright white light was incident on the optical body 1 from the LED light source, and the emitted luminance ($cd/m^2$) was measured with the luminance meter. Also, the normal transmittance (%) at a wavelength of 550 nm was measured as the transmittance of the optical body 1 by the V650 made by JASCO Corporation. As a result, the emitted luminance was 336 $cd/m^2$, and the normal transmittance was 79%.

2. Comparative Example 1

Figure 39:
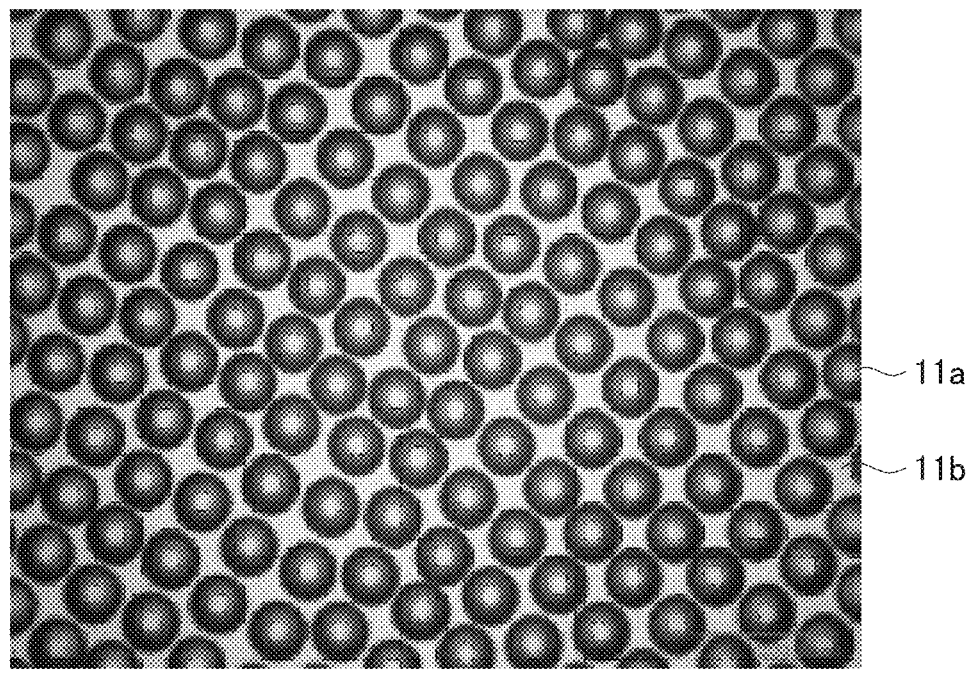
FIG. 39 is a plan-view optical micrograph illustrating an example of a concave-convex structure according to a comparative example.
Figure 40:
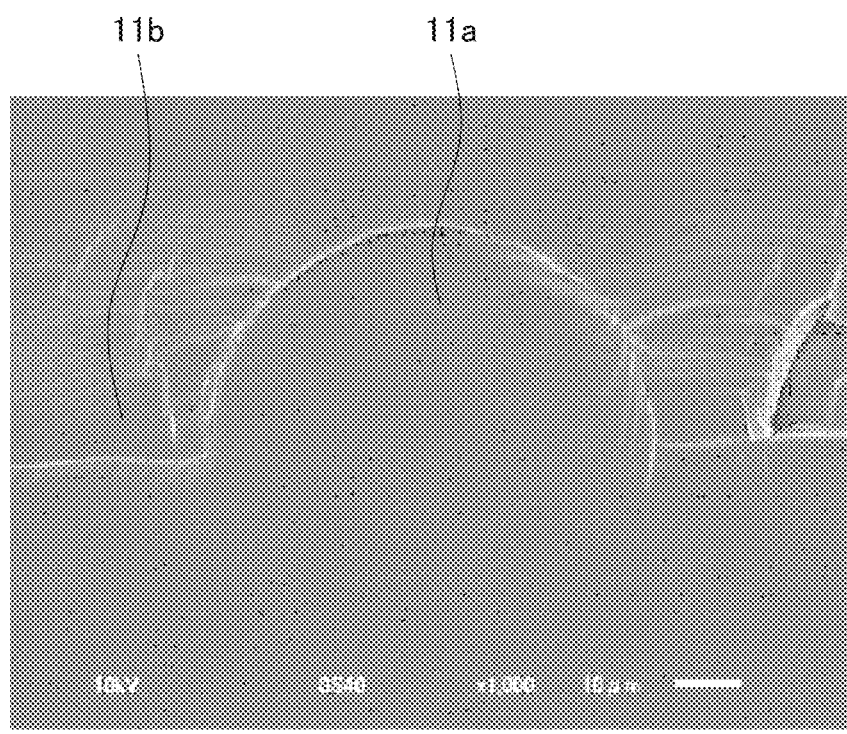
FIG. 40 is a cross-section SEM photograph illustrating an example of the concave-convex structure according to the comparative example.

In Comparative Example 1, an optical body was produced by steps similar to Example 1. Herein, in the optical body 1 according to Comparative Example 1, the convexities 11a have a microlens shape. In other words, the convexities 11a do not have a frustum shape. The radius of curvature of the convexities 11a was set to 33 μm, the diameter in the plan view of the convexities 11a was set to 75 μm, the fill ratio was set to 70%, and the arrangement was set to a random hexagonal close-packed arrangement. FIG. 39 illustrates a plan-view optical micrograph (magnification ×235) of the concave-convex structure 11c, and FIG. 40 illustrates a cross-section SEM photograph (magnification ×1,000) of the concave-convex structure 11c. Also, when the emitted luminance and the normal transmittance were measured similarly to Example 1, the emitted luminance was 286 $cd/m^2$, and the normal transmittance was 28%.

3. Comparison

The results of comparing Example 1 and Comparative Example 1 are that Example 1 exhibits more favorable normal transmittance, even though the fill ratio is higher than in Comparative Example 1. Furthermore, the emitted luminance of Example 1 was more favorable than in Comparative Example 1. Consequently, in Example 1, it was possible to raise the normal transmittance while also maintaining a high emitted luminance. Note that a plurality of the optical bodies 1 of Example 1 were overlaid onto each other, and any one of the optical bodies 1 was turned on and all the remaining optical bodies 1 were turned off. As a result, the light-emitting region of the optical body 1 turned on was distinctly visible. On the other hand, the designs of the light-emitting regions of the optical bodies 1 turned off could hardly be confirmed.

4. Example 2

Figure 30:
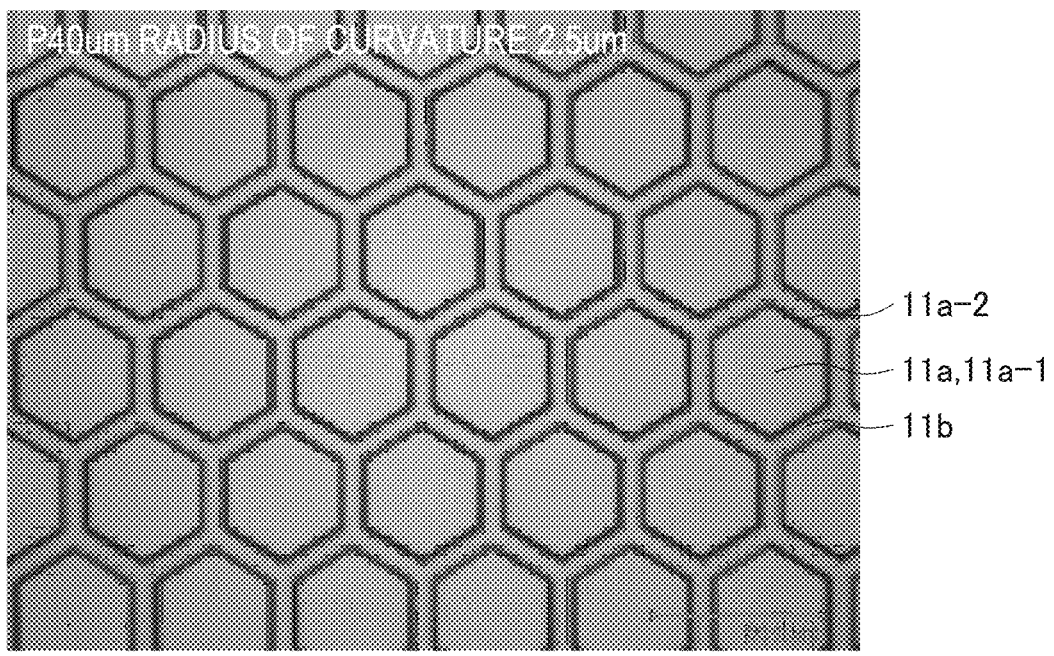
FIG. 30 is a plan-view optical micrograph illustrating an example of the concave-convex structure.

In Example 2, processes similar to Example 1 were performed, except that the frustum shape of the convexities 11a was set to a regular hexagonal frustum shape. Herein, the convexities 11a were arranged in a regular hexagonal close-packed arrangement, and the fill ratio was set to approximately 90%. Also, the pitch of the convexities 11a was set to 40 μm, and the diagonal dimension in the plan view of the hexagonal frustum was set to 33 μm. Also, the radius of curvature of the tapered section 11a-2 was set to 2.5 μm, and the width of the concavities 11b was set to 2.5 μm. FIG. 30 illustrates a plan-view optical micrograph (magnification ×1,045) of the concave-convex structure 11c. The emitted luminance of the optical body 1 was 362 ($cd/m^2$), and the normal transmittance was 75.4%. Consequently, it is apparent that similar effects are obtained even when the frustum shape is a shape other than a circular frustum. Particularly, the fill ratio of 90% is extremely high, but the normal transmittance is a value that compares favorably with Example 1. This is because many flat portions are formed.

5. Example 3

Figure 24:
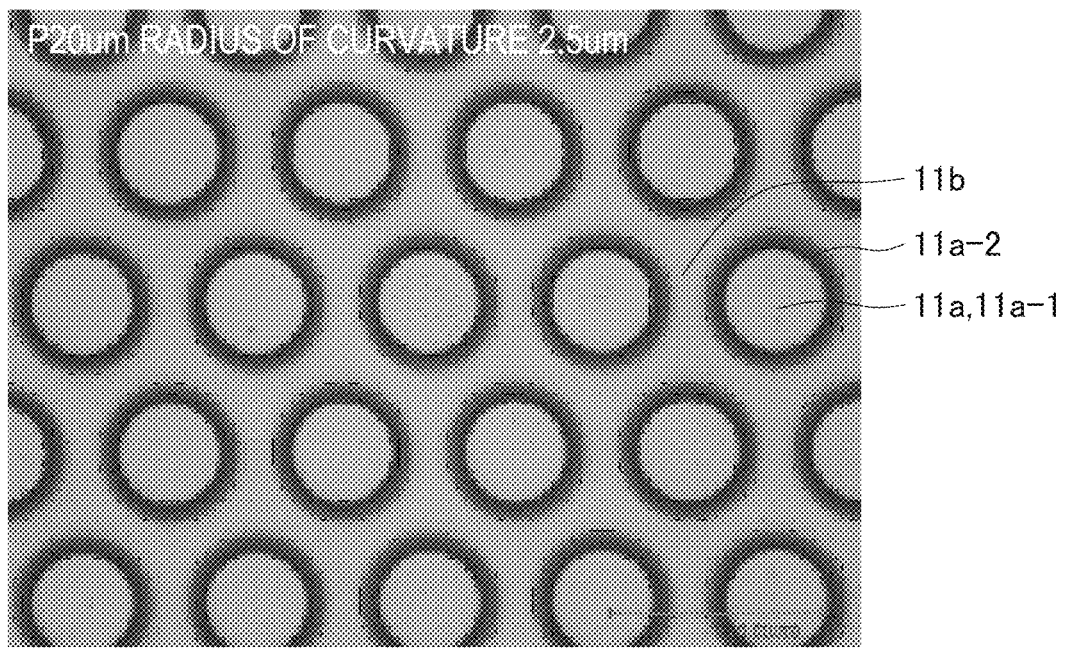
FIG. 24 is a plan-view optical micrograph illustrating an example of the concave-convex structure.
Figure 25:
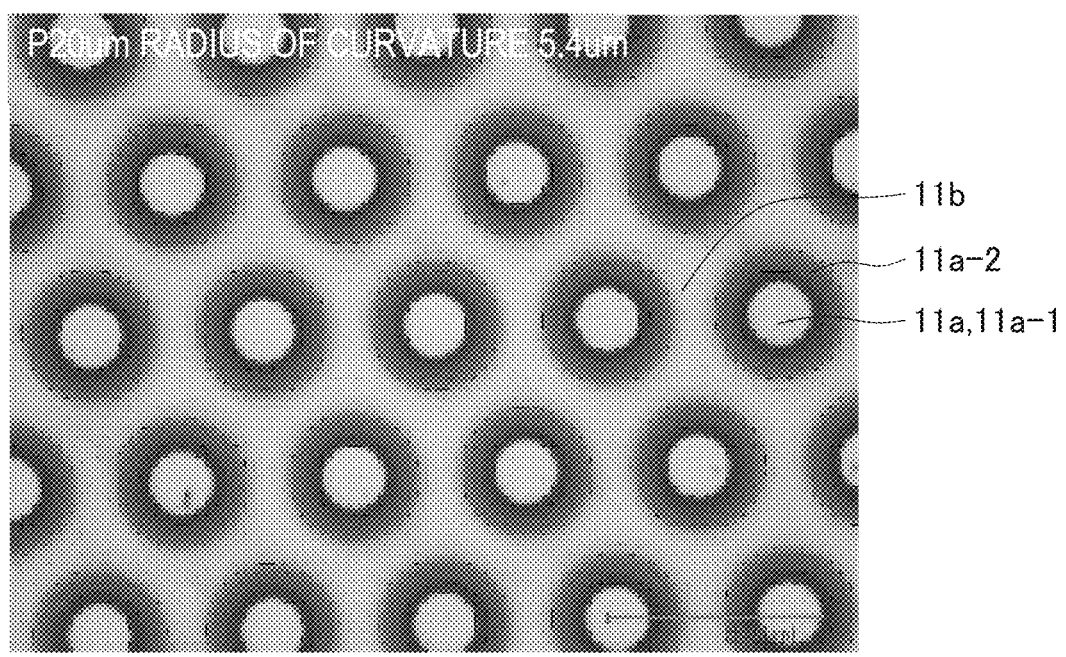
FIG. 25 is a plan-view optical micrograph illustrating an example of the concave-convex structure.

In Example 3, parameters that influence the emitted luminance and the normal transmittance were investigated. Specifically, multiple types of the optical body 1 were produced by steps similar to Example 1. Herein, the convexities 11a were set to a circular frustum shape. Furthermore, the width of the concavities 11b was fixed at 2.5 μm. Furthermore, the pitch was set to one of 10 μm, 20 μm, 40 μm, 80 μm, 160 μm, and 320 μm, and the radius of curvature of the tapered section 11b-2 was set to one of 1.25 μm, 2.5 μm, 5.4 μm, 10.9 μm, and 21.25 μm. FIG. 23 illustrates a plan-view optical micrograph (magnification ×2,090) of the optical body 1 with a pitch of 20 μm and a radius of curvature of 1.25 μm, FIG. 24 illustrates a plan-view optical micrograph (magnification ×2,090) of the optical body 1 with a pitch of 20 μm and a radius of curvature of 2.5 μm, and FIG. 25 illustrates a plan-view optical micrograph (magnification ×2,090) of the optical body 1 with a pitch of 20 μm and a radius of curvature of 5.4 μm. As illustrated in FIGS. 23 to 25, if the pitch is the same and the width of the concavities 11b is the same, the diameter in the plan view (that is, the area) of the convexities 11a becomes the same. Under such conditions, as the radius of curvature becomes larger, the area in the plan view of the tapered section 11a-2 becomes larger, and the area in the plan view of the flat section 11a-1 becomes smaller.

Additionally, the emitted luminance and the normal transmittance of these optical bodies 1 were measured by steps similar to Example 1. The results are illustrated in FIGS. 26 and 27. As a result, it became apparent that, although there is some variation for each pitch, as the radius of curvature of the tapered section 11a-2 becomes larger, the emitted luminance tends to increase, and the transmittance tends to decrease.

Furthermore, the transmittance and the emitted luminance measured above were plotted on an xy plane whose horizontal axis is the transmittance and whose vertical axis is the emitted luminance. Subsequently, an approximation line of these points was computed by the least squares method. As a result, an approximation line with an extremely high coefficient of correlation (0.9 or greater) was drawn. The results are illustrated in FIG. 28. The point P1 indicates measured values of the transmittance and the emitted luminance, and the graph L1 indicates the approximation line. According to FIG. 28, the formula of the approximation line was y=−13.144x+1298.2, and the coefficient of correlation was 0.9057. As a result, it was ascertained that the transmittance and the emitted luminance exist in a unique relationship, regardless of the radius of curvature and the pitch.

Figure 29:
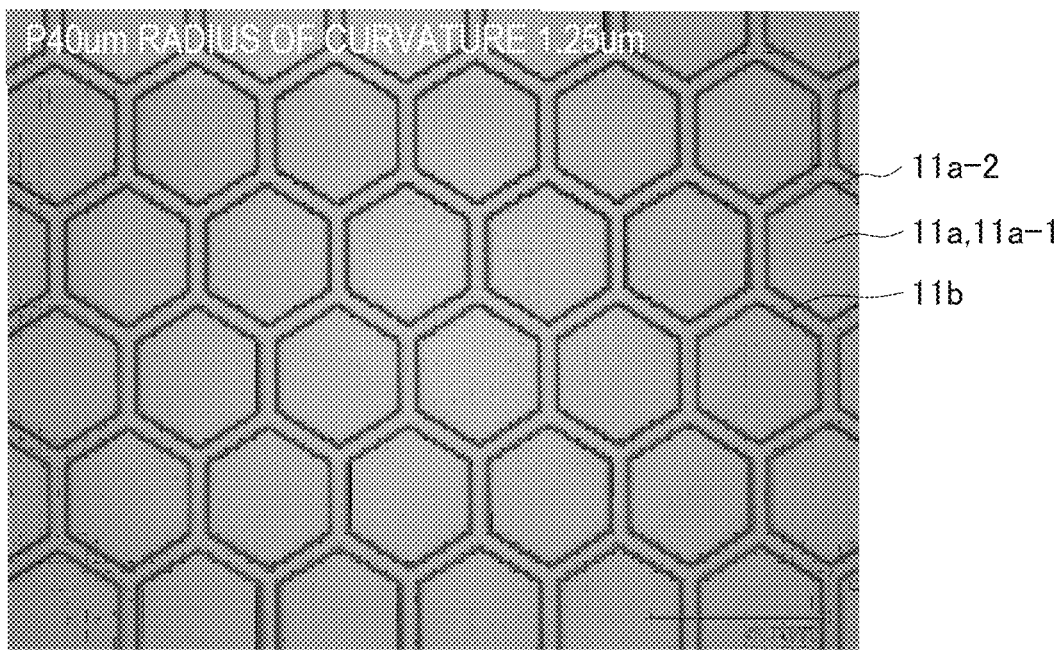
FIG. 29 is a plan-view optical micrograph illustrating an example of the concave-convex structure.
Figure 31:
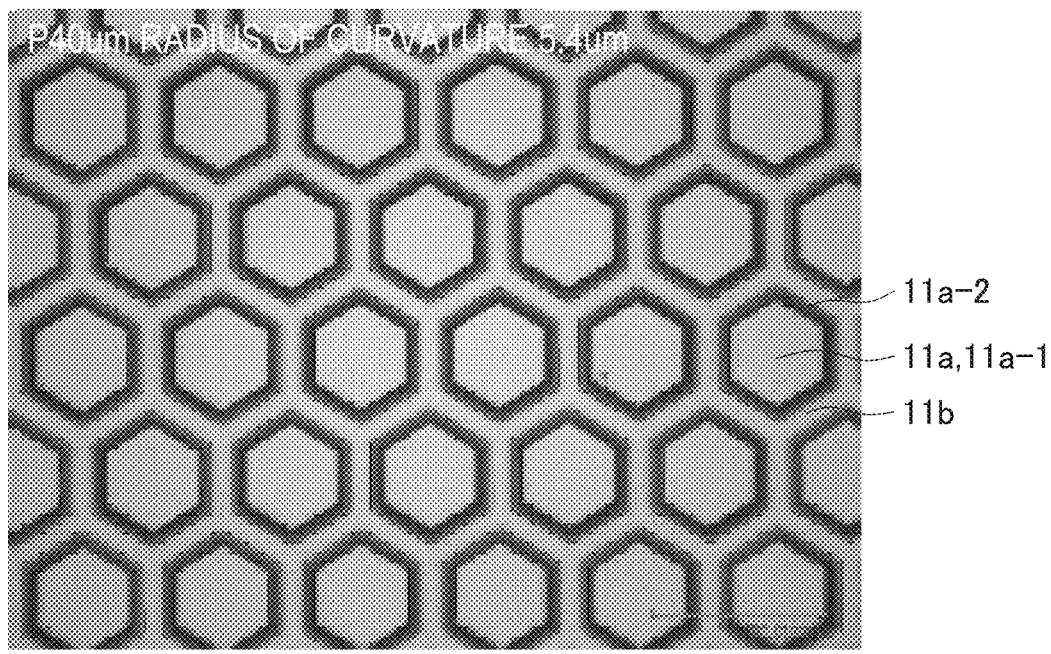
FIG. 31 is a plan-view optical micrograph illustrating an example of the concave-convex structure.
Figure 32:
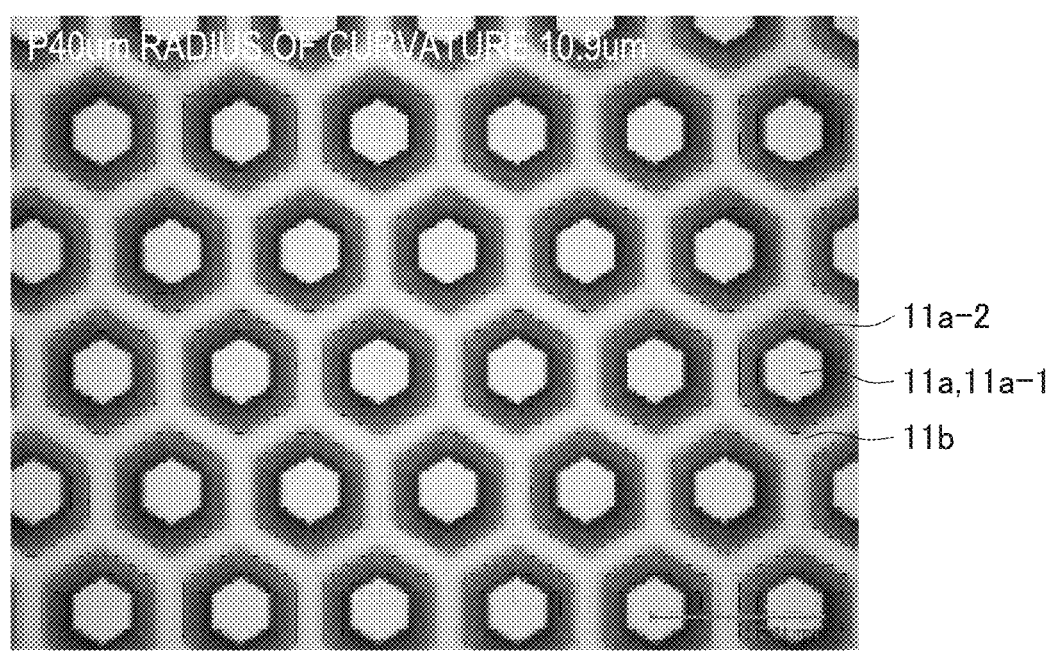
FIG. 32 is a plan-view optical micrograph illustrating an example of the concave-convex structure.
Figure 33:
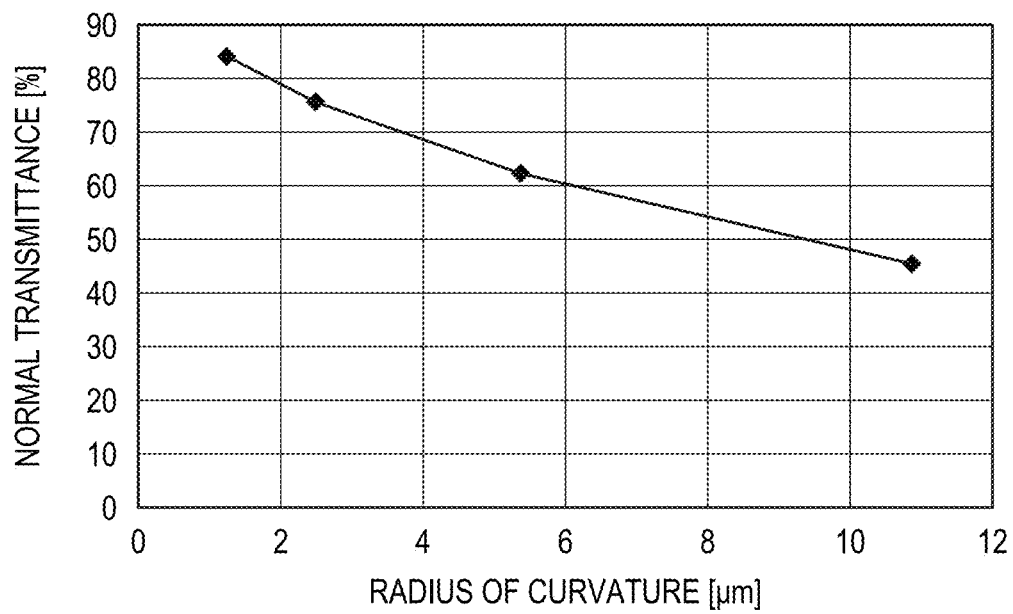
FIG. 33 is a graph illustrating an example of the optical properties of the optical body.
Figure 34:
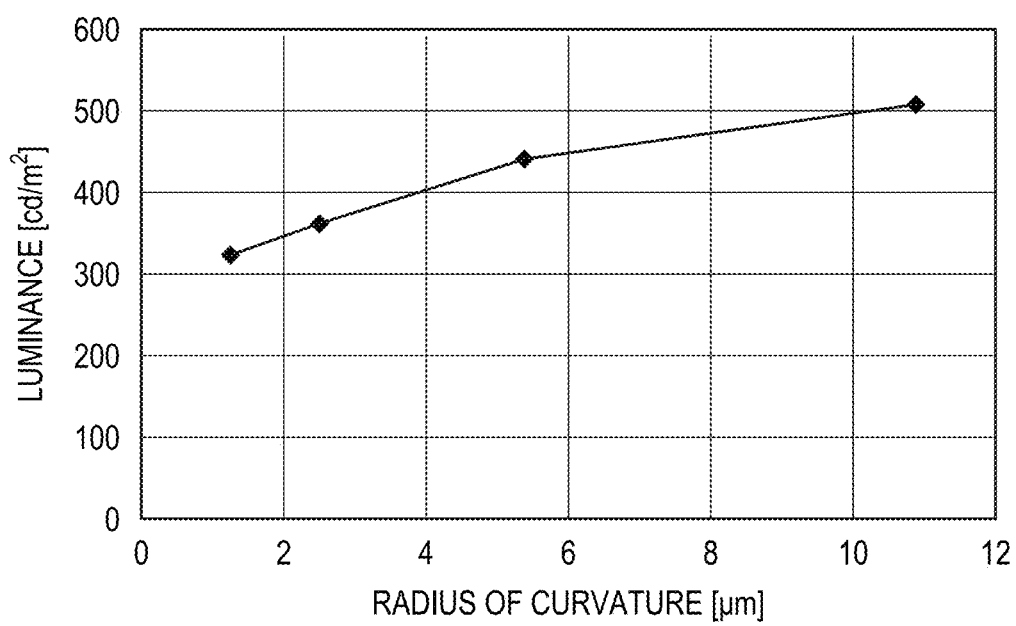
FIG. 34 is a graph illustrating an example of the optical properties of the optical body.

In Example 3, the frustum shape of the convexities 11a was changed and an investigation similar to the above was conducted. Specifically, the convexities 11a were set to a regular hexagonal frustum shape. Furthermore, the width of the concavities 11b was fixed at 2.5 μm. Furthermore, the pitch was set to 40 μm, and the radius of curvature of the tapered section 11a-2 was set to one of 1.25 μm, 2.5 μm, 5.4 μm, and 10.9 μm. Parameters other than the above were set similarly to Example 2. FIG. 29 illustrates a plan-view optical micrograph (magnification ×1,045) of the optical body 1 with a pitch of 40 μm and a radius of curvature of 1.25 μm, and FIG. 30 illustrates a plan-view optical micrograph (magnification ×1,045) of the optical body 1 with a pitch of 40 μm and a radius of curvature of 2.5 μm. FIG. 31 illustrates a plan-view optical micrograph (magnification ×1,045) of the optical body 1 with a pitch of 40 μm and a radius of curvature of 5.4 μm, and FIG. 32 illustrates a plan-view optical micrograph (magnification ×1,045) of the optical body 1 with a pitch of 40 μm and a radius of curvature of 10.9 μm. The correlation between the radius of curvature and both the emitted luminance and normal transmittance is illustrated in FIGS. 33 and 34.

Figure 35:
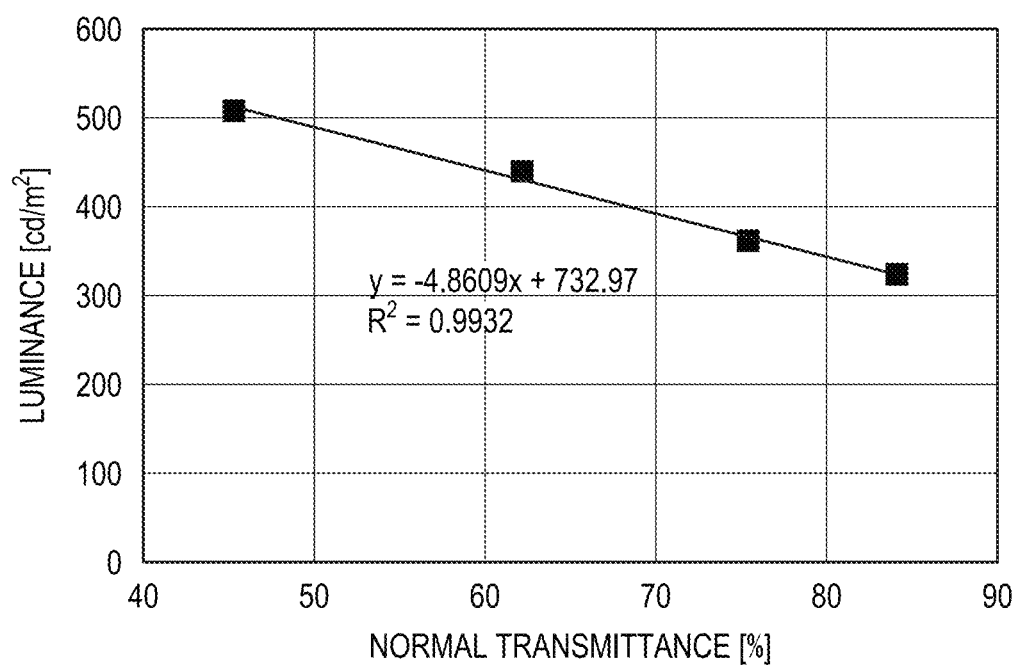
FIG. 35 is a graph illustrating an example of the optical properties of the optical body.

Furthermore, the transmittance and the emitted luminance measured above were plotted on an xy plane whose horizontal axis is the transmittance and whose vertical axis is the emitted luminance. The results are illustrated in FIG. 35. The formula of the approximation line was y=−4.8609x+732.97, and the coefficient of correlation was 0.9932.

Consequently, even when the frustum shape of the convexities 11a was changed to a regular hexagonal frustum, a result similar to the circular frustum shape was obtained. However, the approximation line was different. As a result, if the type of frustum shape is the same (for example, if the frustum structure is a circular frustum shape), the transmittance and the emitted luminance exist in a unique relationship, regardless of the radius of curvature and the pitch. Additionally, the correlation between the transmittance and the emitted luminance is different for each type of frustum shape.

6. Example 4

Figure 36:
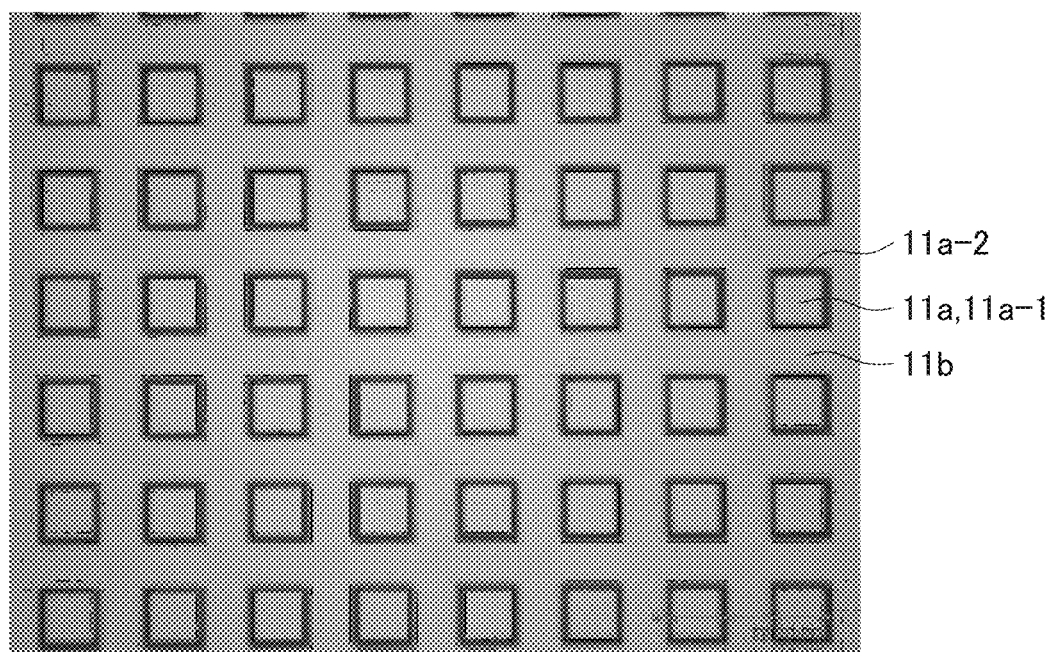
FIG. 36 is a plan-view optical micrograph illustrating an example of the concave-convex structure.
Figure 37:
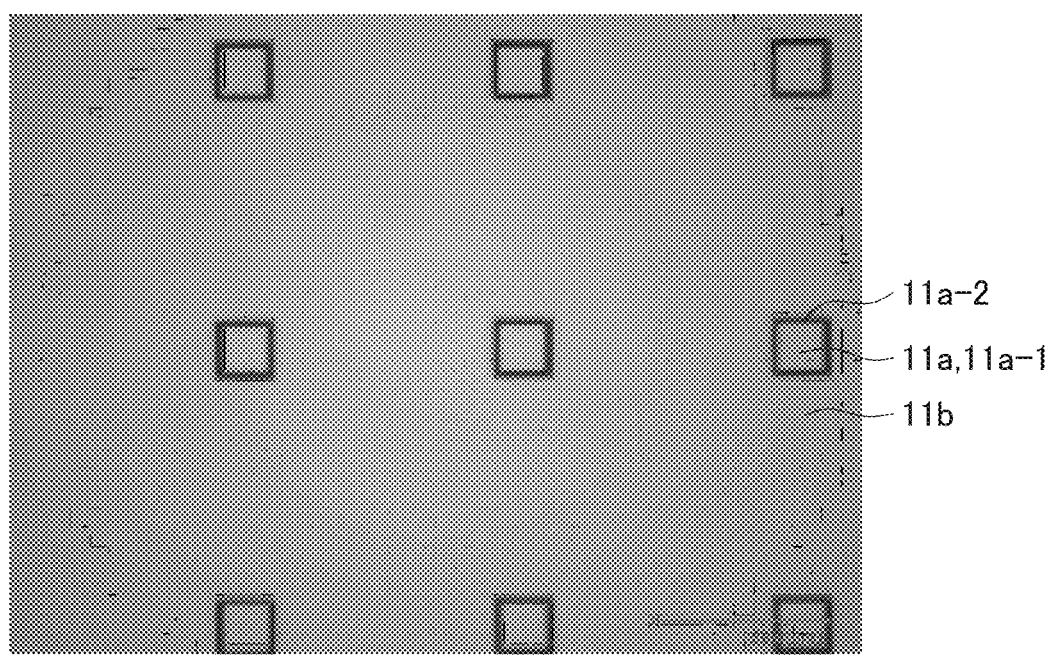
FIG. 37 is a plan-view optical micrograph illustrating an example of the concave-convex structure.

In Example 4, the fill ratio was investigated. Specifically, the convexities 11a were set to a regular quadrilateral frustum shape. The dimensions in the plan view of the convexities 11a were set to 20 μm by 20 μm, and the radius of curvature of the tapered section 11a-2 was set to 2.5 μm. The convexities 11a were arranged in a regular lattice arrangement. Under these conditions, the pitch was set to one of 30 μm (fill ratio approximately 44%), 40 μm (fill ratio approximately 25%), 60 μm (fill ratio approximately 11%), and 80 μm (fill ratio approximately 6%). With this arrangement, since the number of convexities 11a disposed per unit area changes, the fill ratio of the convexities 11a, or in other words, the area ratio of the flat portions (the ratio of the area in the plan view of the flat portions with respect to the total area of the plan view of the concave-convex structure 11c) varies. FIG. 36 illustrates a plan-view optical micrograph (magnification ×1,045) of the optical body 1 with a pitch of 30 μm, and FIG. 37 illustrates a plan-view optical micrograph (magnification ×1,045) of the optical body 1 with a pitch of 80 μm. The emitted luminance and the normal transmittance of these optical bodies 1 were measured similarly to Example 1. The results are illustrated in FIG. 38.

Figure 38:
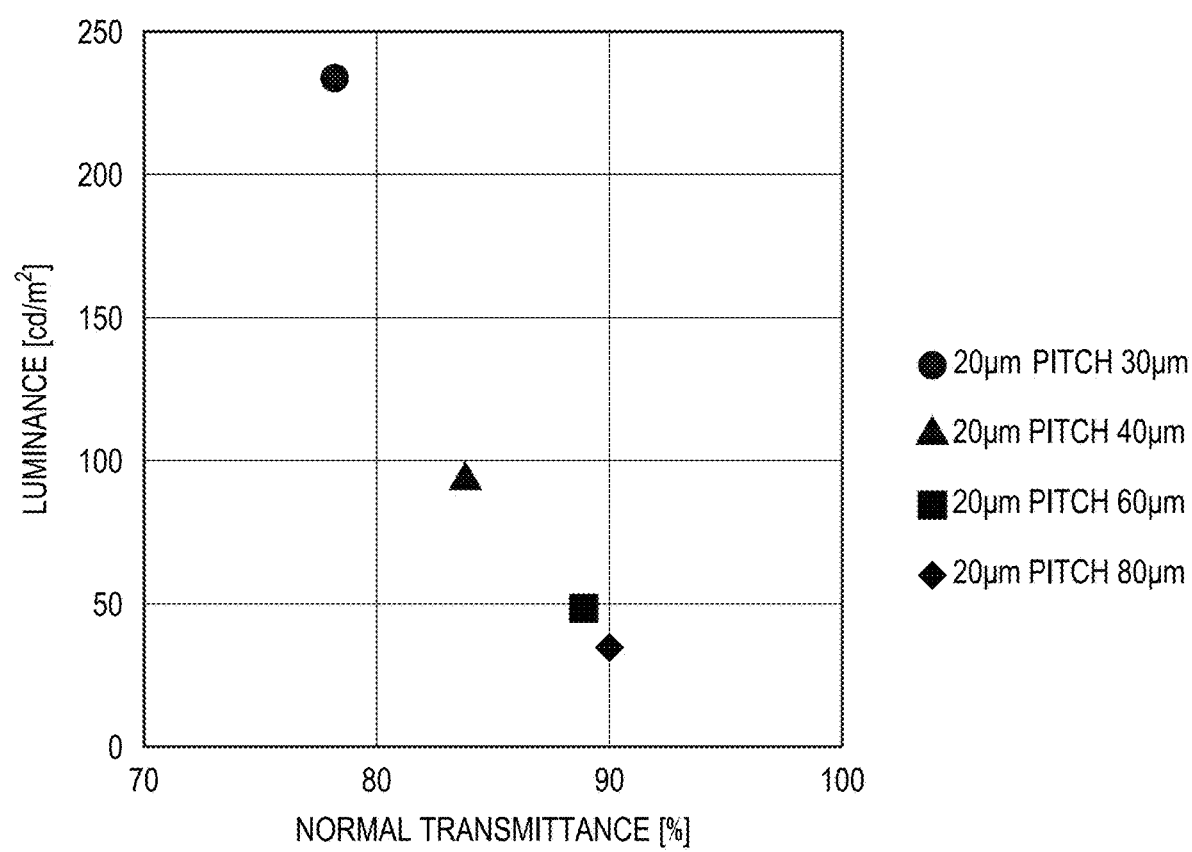
FIG. 38 is a graph illustrating an example of the optical properties of the optical body.

According to FIG. 38, it became apparent that in the case in which the pitch of the convexities 11a becomes 60 μm or less (that is, a fill ratio of 11% or less), the emitted luminance drops to an extremely low value less than 50 (cd/m$^2$). Consequently, it became apparent that a high level of both emitted luminance and normal transmittance could not be achieved by simply making the concave-convex structure 11c take a frustum shape.

The emitted luminance becomes 50 (cd/m$^2$) or greater if the fill ratio is 15% or greater. Consequently, it is desirable for the fill ratio to be at least 15% or greater. As the fill ratio rises (that is, as a greater number of convexities 11a exist per unit area), the emitted luminance increased while the normal transmittance decreased. This correlation was similar to the example described above. However, a high value of normal transmittance could be maintained regardless of the fill ratio. This is because even if the fill ratio is raised, the area of the flat portions still becomes sufficiently large. From these results, if the fill ratio is 15% or greater, basically, a high level of emitted luminance and normal transmittance can be maintained. However, in the case of setting an extremely high fill ratio or the like, the normal transmittance may fall below 50% in some cases. In this case, it is sufficient to adjust the area ratio A/B described below.

7. Example 5

Figure 41:
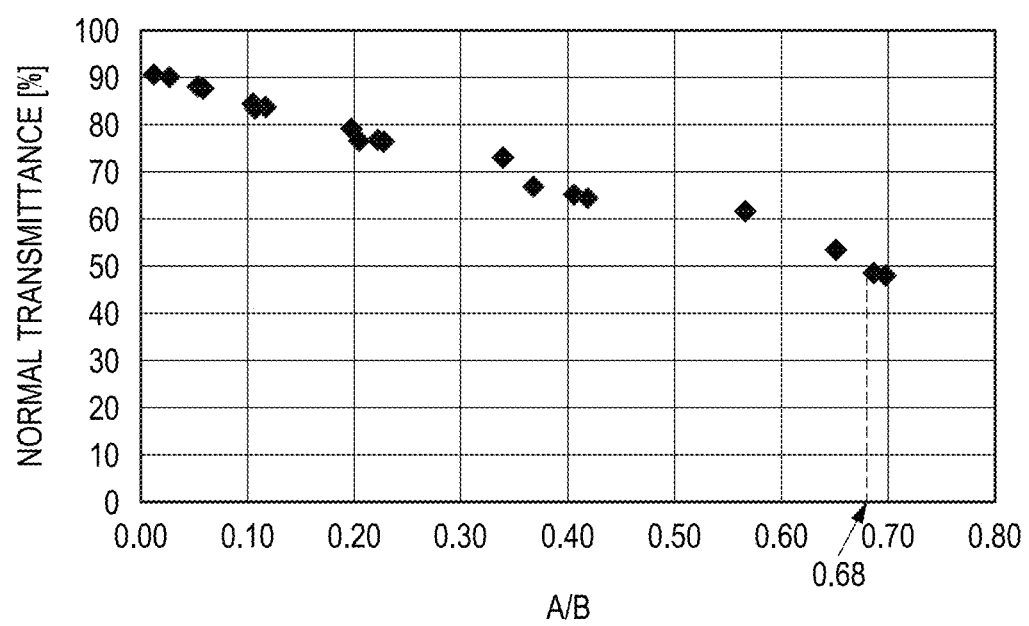
FIG. 41 is a graph illustrating an example of the optical properties of the optical body.

In Example 5, the preferable range of the area ratio A/B was investigated. Specifically, by performing a process similar to Example 1 except for varying the radius of curvature of the tapered section 11a-2, multiple types of optical bodies 1 with different values of the area ratio A/B were produced. In other words, herein, the area B of the unit region X1 was kept fixed, while in the tapered section 11a-2, the area A of the portion 11a-3 existing inside the unit region X1 was modified. Additionally, the emitted luminance and the normal transmittance of these optical bodies 1 were measured by a process similar to Example 1. The results are illustrated in FIG. 41. FIG. 41 demonstrates that, as the area ratio A/B becomes smaller, the normal transmittance rises. Additionally, in the case in which the area ratio A/B becomes 0.68 or less, the normal transmittance becomes 50% or greater, and in the case in which the area ratio A/B becomes 0.40 or less, the normal transmittance becomes 65% or greater. In terms of practical usage, it is sufficient for the transmittance to be 50% or greater, and if 65% or greater, the image due to extraneous light can be displayed more vividly. Consequently, it became apparent that the area ratio A/B is preferably 0.68 or less, and more preferably 0.40 or less.

8. Example 6

In Example 6, an optical body 1 in which the concavities and convexities are the inverse of Example 1 was produced.

Specifically, a transfer mold to which the concavities and convexities of the transfer mold produced in Example 1 are additionally transferred was produced, and by performing a process similar to Example 1 using this transfer mold, an optical body 1 in which the concavities and convexities are the inverse of Example 1 was produced. The inversion of the concavities and convexities was confirmed using surface observation with an optical microscope, cross-sectional observation using a SEM, and also by using the Vertscan (model number: R5300GL-Lite-AC) made by Mitsubishi Chemical Systems, Inc. The emitted luminance of the optical body 1 was 342 cd/m$^2$, and the normal transmittance was 79%. Consequently, similar results were obtained even when the concavities and convexities were interchanged.

9. Example 7

In Example 7, the shape of the convexities 11a was set to a circular frustum shape or deformed polygonal frustum shape, the concave-convex structure 11c was arranged randomly, and the optical properties of the optical body 1 were tested. First, multiple types of the optical bodies 1 were produced by steps similar to Example 1. However, only a Cu layer was used as the base material resist layer when producing the master 100. The Cu layer was formed by sputtering. Pure Etch CR201 made by Hayashi Pure Chemical Ind., Ltd. was used as the Cu etching solution. In addition, the base material of the transfer film was changed from a polyester film to a PET film. In the optical body 1, the concave-convex structure 11c is arranged in a regular hexagonal close-packed arrangement as a reference, and the amount of shift from the reference arrangement was set to one of 2, 3, and 4 μm. The pitch of the reference arrangement was set to one of 20, 30, 40, 50, and 60 μm, and the radius of curvature of the tapered section 11a-2 was fixed at 1.25 μm. Then, the shape of the convexities 11a was set to a circular frustum shape or deformed polygonal frustum shape. In Example 7, thirty types of the optical bodies 1 in total, that is, fifteen types (three types of amounts of shift by five types of pitches) each of the optical bodies 1 in which the convexities 11a have a circular frustum shape and the optical bodies 1 in which the convexities 11a have a deformed polygonal frustum shape, were produced. Herein, in the optical bodies 1 in which the convexities 11a have a deformed polygonal frustum shape, the respective convexities 11a were set to be shaped randomly. Then, the luminance and the transmittance of these optical bodies 1 were measured by a similar method to that of Example 1.

Figure 42:
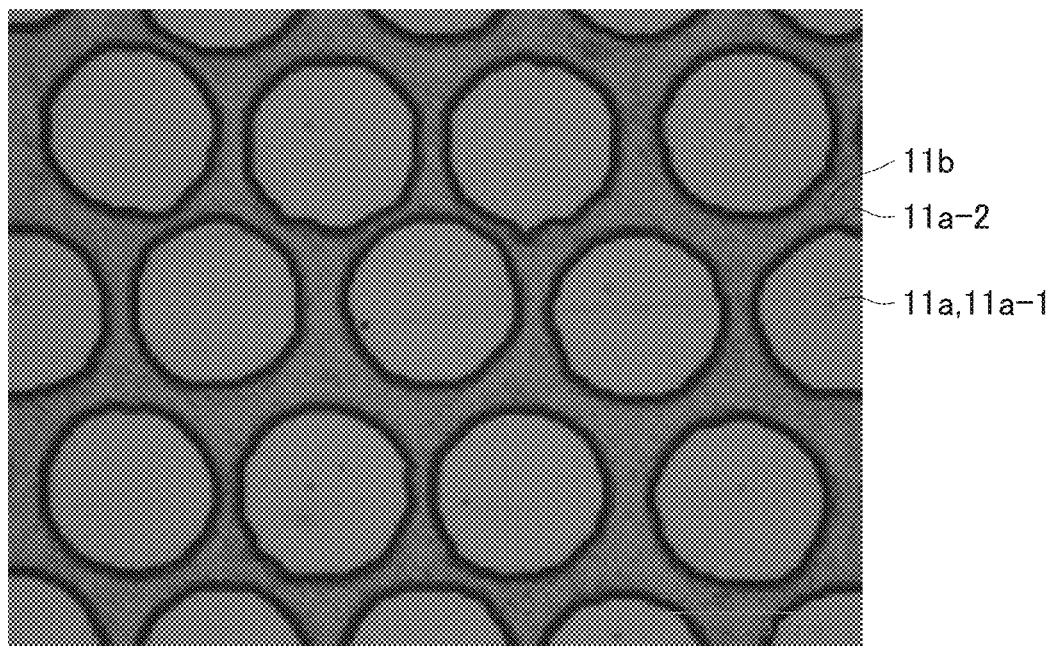
FIG. 42 is a plan-view optical micrograph illustrating an example of the concave-convex structure.

FIGS. 42 to 45 illustrate examples of the optical body 1. FIG. 42 illustrates a plan-view optical micrograph (magnification ×2,090) of the optical body 1 with the convexities 11a of a circular frustum shape, an amount of shift from the reference arrangement of 2 μm, a fill ratio of approximately 83%, a pitch of 30 μm, a diameter of the flat section 11a-1 of 25 μm, and a width of the concavities 11b of 2.5 μm. Note that, since the convexities 11a are arranged randomly in FIGS. 42 to 45, the width of the concavities 11b was set to an arithmetic mean value of widths measured at some measurement points. In the example illustrated in FIG. 42, the emitted luminance of the optical body 1 was 222 (cd/m$^2$), and the normal transmittance was 75%.

Figure 43:
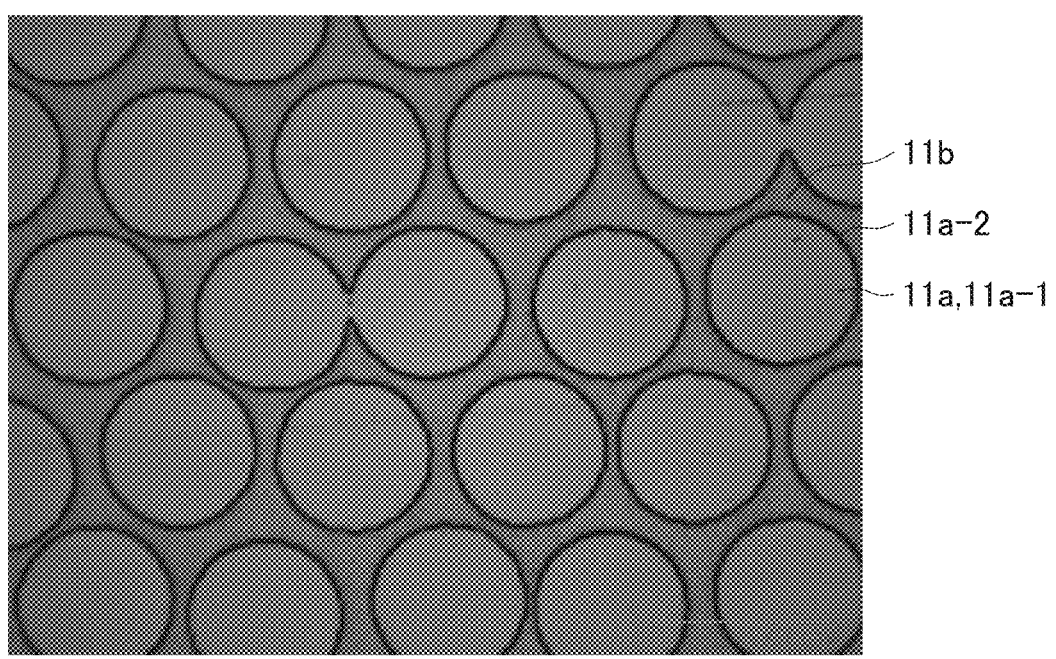
FIG. 43 is a plan-view optical micrograph illustrating an example of the concave-convex structure.

FIG. 43 illustrates a plan-view optical micrograph (magnification ×1,045) of the optical body 1 with the convexities 11a of a circular frustum shape, an amount of shift from the reference arrangement of 4 μm, a fill ratio of approximately 78%, a pitch of 50 μm, a diameter of the flat section 11a-1 of 44 μm, and a width of the concavities 11b of 3.5 μm. In this example, the emitted luminance of the optical body 1 was 162 (cd/m$^2$), and the normal transmittance was 83%.

FIG. 44 illustrates a plan-view optical micrograph (magnification ×2,090) of the optical body 1 with the convexities 11a of a deformed polygonal frustum shape, an amount of shift from the reference arrangement of 2 μm, a fill ratio of approximately 51%, a pitch of 20 μm, a diameter of the flat section 11a-1 of 12.5 μm, and a width of the concavities 11b of 5 μm. Note that, since the convexities 11a have a deformed polygonal frustum shape in FIGS. 44 and 45, the flat section 11a-1 is not circular. Therefore, the diameter of the flat section 11a-1 is an arithmetic mean value of what is called an equivalent circle diameter. That is, an arithmetic mean value of equivalent circle diameters measured in some of the convexities 11a was used as the diameter of the flat section 11a-1. In the example illustrated in FIG. 44, the emitted luminance of the optical body 1 was 179 (cd/m$^2$), and the normal transmittance was 73%.

FIG. 45 illustrates a plan-view optical micrograph (magnification ×1,568) of the optical body 1 with the convexities 11a of a deformed polygonal frustum shape, an amount of shift from the reference arrangement of 4 μm, a fill ratio of approximately 69%, a pitch of 30 μm, a diameter of the flat section 11a-1 of 23.6 μm, and a width of the concavities 11b of 3.9 μm. In this example, the emitted luminance of the optical body 1 was 166 (cd/m$^2$), and the normal transmittance was 78%.

As is apparent from the micrographs of FIGS. 42 to 45, since the convexities 11a have a frustum shape even in the case where the convexities 11a of a circular frustum shape or deformed polygonal frustum shape were arranged randomly, it is understood that the concave-convex structure 11c includes many flat portions. Furthermore, similar to the example in which the convexities 11a are arranged regularly, high emitted luminance and high transmittance are achieved.

Next, the transmittance and the emitted luminance measured for each of the optical bodies 1 were plotted on an xy plane whose horizontal axis is the transmittance and whose vertical axis is the emitted luminance. Subsequently, an approximation line of these points was computed by the least squares method. As a result, an approximation line with an extremely high coefficient of correlation (0.9 or greater) was drawn. The results are illustrated in FIG. 28. The point P2 indicates measured values of the transmittance and the emitted luminance, and the graph L2 indicates the approximation line. The relationship between the transmittance and the emitted luminance of an optical body of the related art is also illustrated in FIG. 28 for comparison. The point P3 indicates an example in which the light extraction section was subjected to embossing, and the point P4 indicates an example in which the light extraction section was a microlens array. The line L3 is an approximation line of the points P3 and P4. As is apparent from FIG. 28, regardless of whether or not the shape of the convexities 11a is a deformed polygonal frustum shape or whether or not the arrangement of the concave-convex structure 11c is a periodic arrangement, light can be extracted with higher efficiency than in the example of the related art, and extraneous light can be transmitted.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

REFERENCE SIGNS LIST 1 optical body
10 base material
10A, 10B surface
11 light extraction section
11a convexities
11a-1 flat section
11a-2 tapered section
11b concavities
11b-1 flat section
11b-2 tapered section
20 light source
100 master
110 master base material
120 master concave-convex structure

The invention claimed is:

1. An image display apparatus comprising:
a plurality of light-emitting apparatuses, each of the light-emitting apparatuses comprising:
an optical body; and
a light source, provided on a side face of the optical body, and configured to cause light to be incident inside the optical body from the side face of the optical body,
the optical body comprising:
a base material; and
a light extraction section, formed on at least one surface of the base material, that extracts internally propagated light incident inside the base material from a side face of the base material to an outside of the base material, thereby forming extracted light, wherein
the light extraction section includes a concave-convex structure in which at least one of concavities and convexities has a frustum shape,
a fill ratio of the concave-convex structure is 15% or greater, and
a light transmittance is 50% or greater, and
wherein the light-emitting apparatuses are overlaid onto each other in a direction of the extracted light outside of the base material.

2. The image display apparatus according to claim 1, wherein
the concave-convex structure is arranged periodically.

3. The image display apparatus according to claim 1, wherein
the concave-convex structure is arranged by any one or more modes selected from a group consisting of a lattice arrangement, a staggered arrangement, and a hexagonal close-packed arrangement.

4. The image display apparatus according to claim 2, wherein
a ratio A/B of an area B of a unit region obtained by interconnecting central axes of minimum structural units of the concave-convex structure and an area A of a portion existing inside the unit region in a tapered section included in the minimum structural unit is 0.68 or less.

5. The image display apparatus according to claim 1, wherein
the concave-convex structure is arranged randomly.

6. The image display apparatus according to claim 1, wherein
the concave-convex structure includes any one or more types of frustum shapes selected from a group consisting of a circular frustum, an elliptical frustum, a regular polygonal frustum, a polygonal frustum, a semi-circular frustum, a quarter-circular frustum, and a deformed polygonal frustum.

7. The image display apparatus according to claim 1, wherein
the base material includes any one or more types of materials selected from a group consisting of acrylic resin, polycarbonate, polyethylene terephthalate, and glass.

8. The image display apparatus according to claim 1, wherein
the concave-convex structure includes a cured ultraviolet-curing resin.

* * * * *